(12) United States Patent
Rashed

(10) Patent No.: US 10,895,146 B1
(45) Date of Patent: Jan. 19, 2021

(54) WATER LEVEL AND WELL DEPTH MEASURING DEVICE

(71) Applicant: King Abdulaziz University, Jeddah (SA)

(72) Inventor: Mohamed Ahmed Ahmed Rashed, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 16/986,799

(22) Filed: Aug. 6, 2020

(51) Int. Cl.
*E21B 47/047* (2012.01)
*E21B 47/12* (2012.01)
*E21B 47/01* (2012.01)
*G01F 23/00* (2006.01)

(52) U.S. Cl.
CPC ............ *E21B 47/047* (2020.05); *E21B 47/01* (2013.01); *E21B 47/12* (2013.01); *G01F 23/0023* (2013.01)

(58) Field of Classification Search
CPC ...... E21B 47/003; E21B 47/04; E21B 47/047; G01F 23/0023
See application file for complete search history.

(56) References Cited

U.S. PATENT DOCUMENTS

| | | | | |
|---|---|---|---|---|
| 1,555,802 A | * | 9/1925 | Huber | E21B 47/047 |
| | | | | 324/325 |
| 2,859,614 A | * | 11/1958 | Larson | E21B 47/08 |
| | | | | 73/149 |
| 3,311,983 A | * | 4/1967 | Green | E21B 47/047 |
| | | | | 33/715 |
| 5,031,452 A | * | 7/1991 | Dobson | G01F 23/24 |
| | | | | 73/304 R |

(Continued)

FOREIGN PATENT DOCUMENTS

| | | | |
|---|---|---|---|
| CN | 202229811 U | 5/2012 | |
| CN | 206420531 U | 8/2017 | |
| FR | 848270 A | * 10/1939 | ............. E21B 47/04 |

OTHER PUBLICATIONS

METER Group; Hyrdros 21 Coductivity / Temperature / Depth Sensor; 2017-2020 METER Group, Inc. USA; 4 Pages.

(Continued)

*Primary Examiner* — Nathaniel J Kolb
(74) *Attorney, Agent, or Firm* — Oblon, McClelland, Maier & Neustadt, L.L.P.

(57) ABSTRACT

A water level and well depth measuring device includes a measuring probe, a control switch, a processing unit, an external power source, and a housing. The measuring probe is inserted into a well to determine a depth to a water level and a depth to a well bottom. An insulated cable, which connects the measuring probe and the housing, is used to lower the measuring probe into the well. The control switch, preferably a three-way switch, the processing unit, and the external power source are integrated into the housing. The control switch may be used to alternate between a level-measuring module and a base-measuring module of the measuring probe. The measuring probe is communicably coupled with the processing unit. Therefore, when the level-measuring module detects a water level and when the base-measuring module is at a well bottom, the processing unit activates a visual indicator and an audible alarm.

18 Claims, 34 Drawing Sheets

(56) References Cited

U.S. PATENT DOCUMENTS

| | | | | |
|---|---|---|---|---|
| 5,237,857 A * | 8/1993 | Dobson | ............. | G01F 23/292 |
| | | | | 73/61.44 |
| 5,729,206 A * | 3/1998 | Divens | ............. | G01F 23/0023 |
| | | | | 340/618 |
| 5,828,003 A * | 10/1998 | Thomeer | ............. | E21B 47/053 |
| | | | | 174/69 |
| 7,938,002 B1 * | 5/2011 | Lazos | ............. | G01F 23/0023 |
| | | | | 73/290 B |
| 2004/0206492 A1 * | 10/2004 | Skalski | ............. | E21B 47/04 |
| | | | | 166/66.5 |

OTHER PUBLICATIONS

Heron Instruments Inc. ; dipper-T Four Function Water Level Meter Operating and Maintenance Instructions ; 2 Pages.

Solinst ; Water Level Meter Model 101 Data Sheet ; Mar. 25, 2015 ; 2 Pages.

LSASD Field Branch Chief ; Groundwater Level and Well Depth Measurement ; U.S. Environmental Protection Agency ; May 15, 2020 ; 7 Pages.

Solinst ; Interface Meter Model 122 Data Sheet ; Jan. 21, 2020 ; 2 Pages.

Solinst ; Water Level Meter Model 101B Data Sheet ; Jan. 26, 2016 ; 1 Page.

Oregon Water Resources Department in collaboration with Oregon State University Sea Grant Extension ; How to Measure the Water level in a Well (using and electric water level meter) ; Jun. 2009 ; 20 Pages.

Solinst ; Well Casing & Depth Indicator Model 105 Data Sheet ; Oct. 3, 2019 ; 2 Pages.

\* cited by examiner

WATER LEVEL AND WELL DEPTH MEASURING DEVICE

STATEMENT OF PRIOR DISCLOSURE BY THE INVENTORS

Aspects of the present disclosure are described in M. Rashed, Dual-function water-level/well-depth meter, Measurement, Volume 152, February 2020, https://doi.org/10.1016/j.measurement.2019.107326, available online Nov. 27, 2019, incorporated herein by reference in its entirety.

BACKGROUND

Field of the Invention

The present disclosure relates to depth measuring devices used in hydrology, hydrogeology, and geology. More specifically, the present disclosure describes a depth measuring device that may be used to measure a depth to a water level and a depth to a well bottom.

Description of the Related Art

A depth to a water level and a depth to a well bottom are parameters used in hydrology and hydrogeology, and more particularly in the development of domestic water wells. The depth to the water level is used to calculate a water table for unconfined aquifers, and a piezometric head for confined aquifers. The depth to the water level is generally used to monitor groundwater and estimate parameters such as flow direction, flow rates, transmissivity, sources of groundwater recharge, and hydraulic conductivity of aquifers. The well depth is generally used to conduct pumping tests and calculate water volume in aquifers. The well depth is also utilized in groundwater management and calculating parameters such as the safe yield. Safe yield of a groundwater basin or aquifer system is defined as the amount of water that can be withdrawn without producing an undesired effects such as reduction in ecological base flows and depletion of reserves.

As seen in FIG. 1 and FIG. 2, a majority of depth measuring devices includes a stainless steel probe which is electronically connected to a control circuit via a tape or a cable. A housing, which encloses the control circuit, is positioned at ground level. The cable allows the stainless steel probe to be lowered into a well in which the water level needs to be measured. When the stainless steel probe contacts water, a corresponding circuit is completed and a user is notified regarding the water level through an audible alarm and/or an indicator light that are electronically connected to the control circuit. See Solinst (2014). Water Level Meter Operating Instructions. https://www.solinst.com/products/level-measurement-devices/101-water-level-meter/operating-instructions/101-water-level-meter.php. Last accessed: Aug. 2, 2019, incorporated herein by reference in its entirety.

Even though the depth to the water level may be determined through a measuring process, the well depth is generally determined through an approximation process. In one aspect, a change in the weight of the stainless steel probe upon contacting the well bottom is used to determine the well depth. In particular, the weight difference is determined by a user lowering the stainless steel probe into the well. In another aspect, a length at which a change in tension occurs in the cable, wherein the tension changes when the stainless steel probe is lying at the well bottom, is considered when determining the depth to the well bottom. However, since the depth to the well bottom is considered by an estimation process, the results may be inaccurate. See Taylor, C. and Alley, W. (2001). Ground water level monitoring and the importance of long-term water level data collection. U.S. Geological Survey, Circular 1217, incorporated herein by reference in its entirety.

When the depth to the well bottom is estimated by sensing a weight change in the stainless steel probe, the buoyancy of the tape/cable may lead to inaccurate results. Furthermore, when used in deep wells with long water columns, the weight fluctuations that occur in the tape/cable may lead to inaccurate readings. Due to the weight fluctuations that occur in the tape/cable with increasing depth, the existing depth measuring techniques may only be used with wells in a limited depth range. Additionally, soft sediments at a well bottom may add complexity to existing well depth measuring processes, and may lead to inaccurate depth readings. See Striggow, B. (2013). Operating procedures: Groundwater level and well depth measurements. US Environmental protection Agency, Science and Ecosystem Support Division, Athens, Ga. No. SESDPROC-105-R2, 9p, incorporated herein by reference in its entirety.

In a different technique, as seen in FIGS. 3A-3C, two probes may be used with a depth measuring device. In particular, a first probe may be used to measure the depth to a water level and a second probe may be used to measure the depth to the well bottom. See PASI (2019). Water Level Indicators (Level & Downhole)/Mod. BFK-FF. https://pdf-directindustry.com/pdf/pasi/water-level-indicators-level-downhole-mod-bfk-ff/57451-737028.html. Last accessed: Dec. 6, 2019, incorporated herein by reference in its entirety. However, when two probes are used, the overall process associated with measuring the depth to the water level and the depth to the well bottom may be complex and time consuming. For example, if the depth to the water level is initially measured, in order to measure the depth to the well bottom, the tape/cable needs to be retracted and the water level measuring probe needs to be removed. Next, the well depth measuring probe needs to be attached and lowered into the well. When switching from the level measuring probe to the well depth measuring probe or vice versa, an attachment point between the tape/cable and each of the probes may be damaged with repeated use, and the overall longevity of the pair of probes may be negatively impacted.

In a different technique, as shown in FIG. 4, a collapsible plastic cover may be terminally connected to a probe of the depth measuring device. See HERON (2019). Dipper-T Four Function Water Level Meter. https://www.heroninstruments.com/products/water-level-meters/dipper-t. Last accessed: Dec. 6, 2019, incorporated herein by reference in its entirety. The collapsible plastic cover collapses upon contacting the well bottom, and disconnects an audible alarm, wherein the audible alarm is activated throughout the process of lowering the probe into the well. The preference for a continuously activated audible alarm that disconnects only upon contacting the well bottom may vary from one user to another. Since the depth to the well bottom needs to be measured at the time the audible alarm is disconnected, the time available to measure the depth may be limited. Thus, inaccurate measurements may be obtained prompting multiple tests. Since the cable needs to be retracted and lowered in each test, the overall time used for a measurement may be considerable. Moreover, with the use of the collapsible plastic cover, a sealing in the probe may be affected resulting in inaccurate depth readings.

In view of the difficulties and drawbacks of the existing depth measuring devices, the present disclosure describes a water level and well depth measuring device that eliminates the need to switch probes or repeat the measuring process as required in existing depth measuring devices.

SUMMARY OF THE INVENTION

The present disclosure describes a water level and depth measuring device that may be used to measure a depth to a water level in a well and a depth to a well bottom. In contrast to conventional depth measuring devices, when the depth measuring device of the present disclosure is utilized, the depth to the water level and the depth to the well bottom may be sequentially measured using one probe. Thus, the overall time and effort required for the measuring process may be reduced. Furthermore, since the overall number of components used in the depth measuring device of the present disclosure is lesser than of the existing depth measuring devices, the overall cost associated with the measuring process may also be lowered.

The water level and depth measuring device of the present disclosure includes a measuring probe, a control switch, a processing unit, an external power source, and a housing. The control switch, the processing unit and the external power source are preferably integrated into the housing which is positioned adjacent to a well opening at surface level. The measuring probe is connected to the housing via an insulated cable, wherein a length of the insulated cable allows the measuring probe to be lowered into the well. A depth to a water level in the well may be determined using a level-measuring module of the measuring probe. A depth to a well bottom may be determined using a base-measuring module of the measuring probe. The external power source, the measuring probe, the control switch, and the processing unit are electronically connected to each other. Thus, the processing unit may include program instructions to activate a visual indicator and an audible alarm when the measuring probe is at the water level. Furthermore, the processing unit may include program instructions to activate a visual indicator and an audible alarm when the measuring probe is in contact with a well bottom. The insulated cable may be used to measure the depth to the water level and also to measure the depth to the well bottom.

The water level and well depth measuring device of the present disclosure utilizes a single probe, wherein the single probe may be used to measure the depth to the water level and subsequently used to measure the depth to the well bottom. Since the measuring process is performed sequentially, the overall time and effort required for the measuring process is reduced compared to conventional depth measuring devices. By using one probe for measuring the depth to the water level and the depth to the well bottom, the overall longevity of the probe may be extended by reducing wear and tear. Moreover, the depth measuring device of the present disclosure may reduce the overall number of components used in the measuring process and thus, the overall cost associated with measuring process may be reduced. In terms of weight, the depth measuring device of the present disclosure may weigh less than a majority of existing depth measuring devices. Thus, the depth measuring device of the present disclosure may be beneficial in terms of handling. The water level and well depth measuring device of the present disclosure may be used in fields that may be, but are not limited to, hydrology, hydrogeology, geology, and environmental management, inspection, monitoring, and protection.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

All illustrations of the drawings are for the purpose of describing selected embodiments of the present disclosure and are not intended to limit the scope of the present disclosure or accompanying claims.

The present disclosure describes a depth measuring device that may be used to measure a depth to a water level and a depth to well bottom using a single measuring probe. By using one probe to measure the depth to the water level and the depth to the well bottom, the need to switch probes for each of the measurements, as required in conventional depth measuring devices, may be eliminated. Thus, the overall time and effort required for a depth measuring process may be reduced by utilizing the water level and well depth measuring device of the present disclosure.

Figure 1:
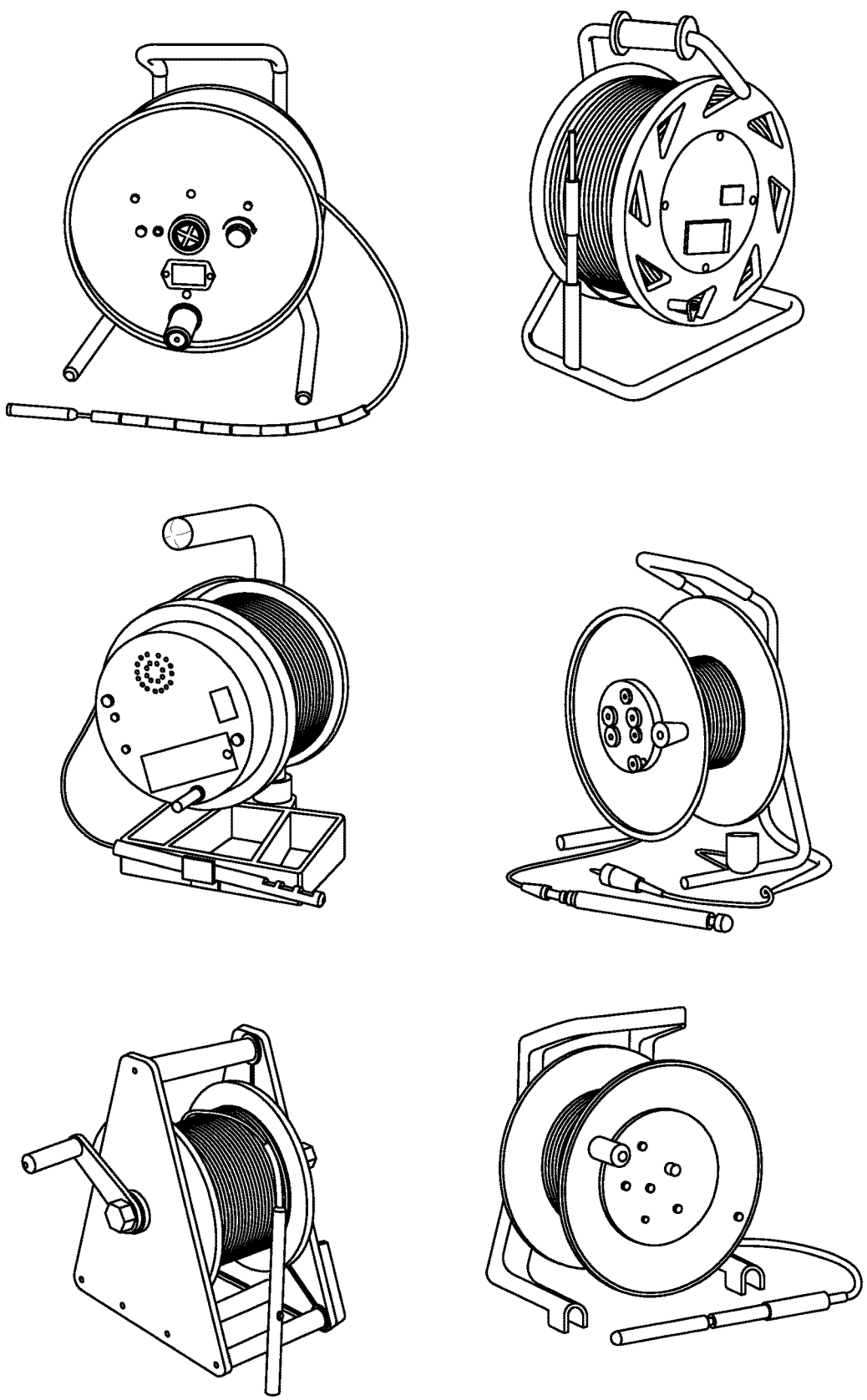
FIG. 1 is an illustration of existing water level measuring devices.
Figure 2:
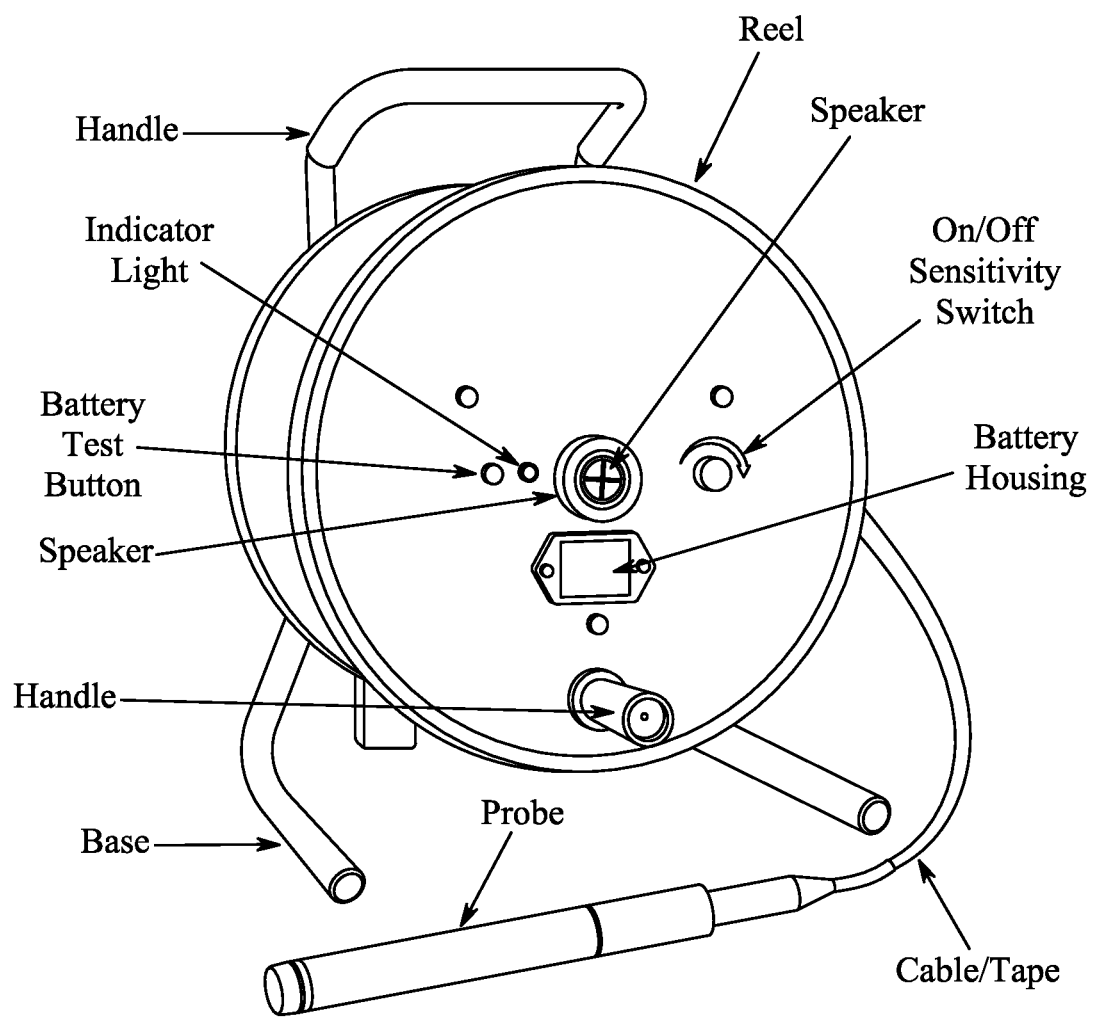
FIG. 2 is an illustration of the components used in an existing water level measuring device.
Figure 3A:
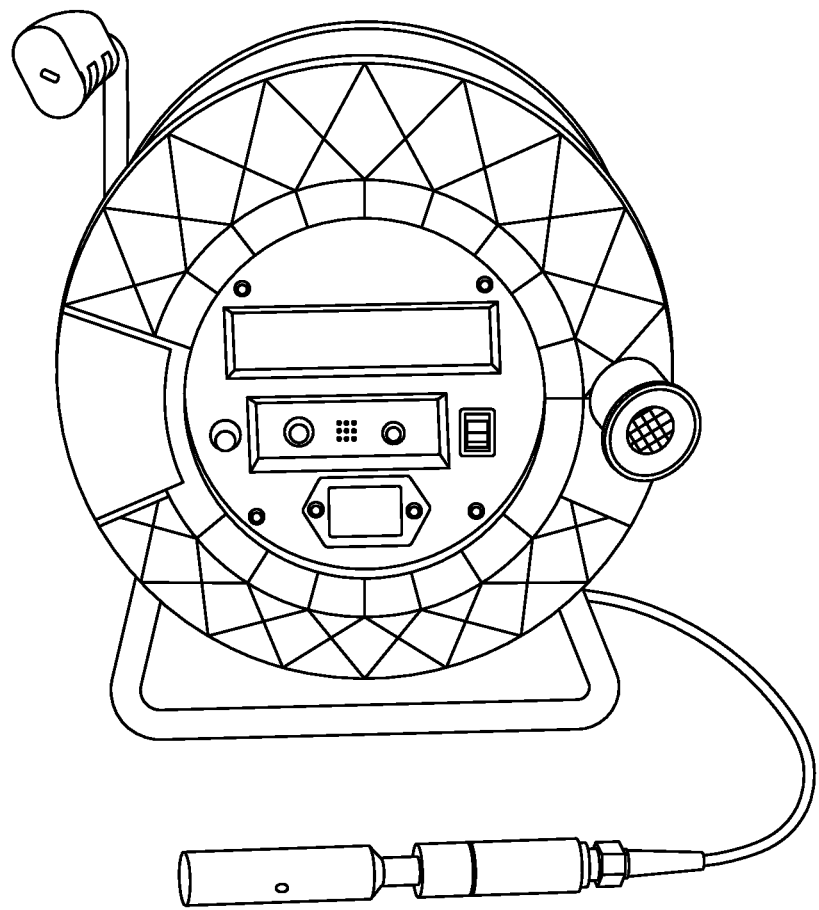
FIG. 3A is an illustration of a water level measuring device, wherein different probes are used with the water level measuring device.
Figure 3B:
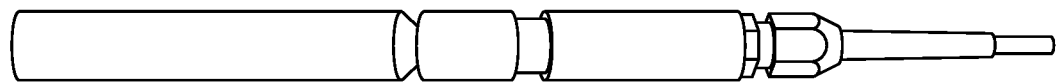
FIG. 3B is an illustration of a first probe that may be used with the water level measuring device shown in FIG. 3A.
Figure 3C:
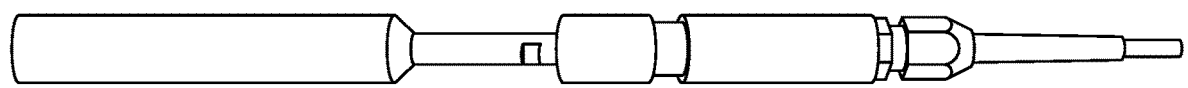
FIG. 3C is an illustration of a second probe that may be used with the water level measuring device shown in FIG. 3A.
Figure 4:
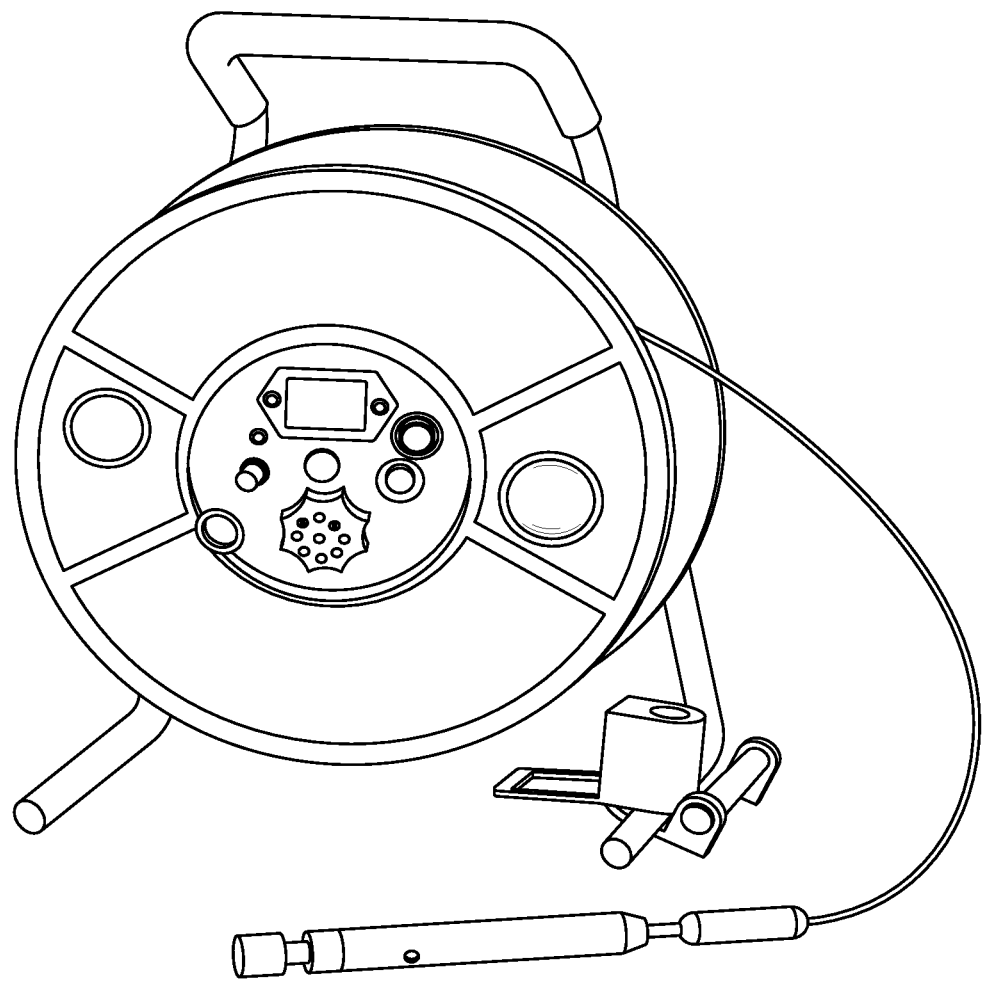
FIG. 4 is an illustration of a water level measuring device, wherein a measuring probe of the water level measuring device includes a collapsible plastic cap, wherein an alarm is deactivated when the plastic cap contacts a well bottom.
Figure 5A:
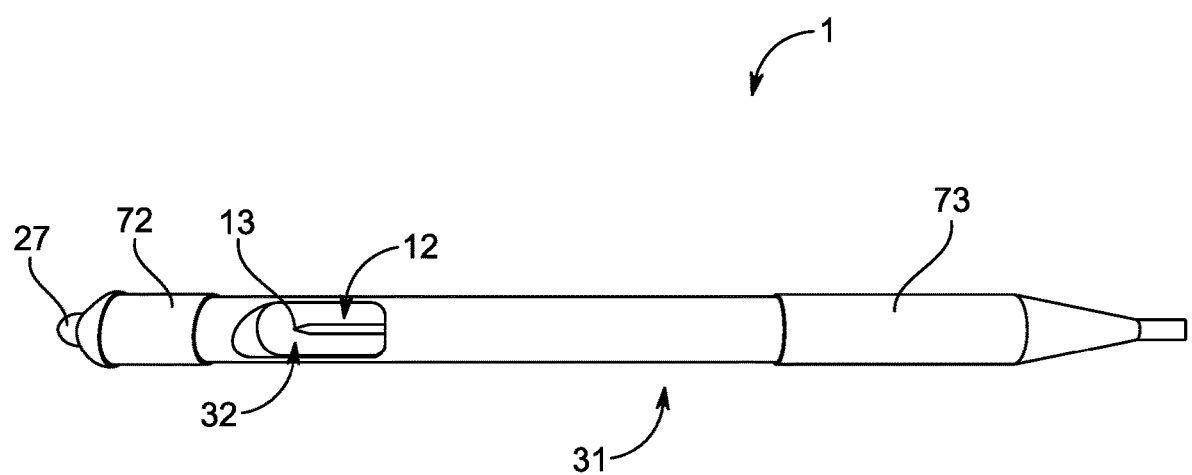
FIG. 5A is an illustration of a measuring probe used in the water level and well depth measuring device described in the present disclosure.
Figure 5B:
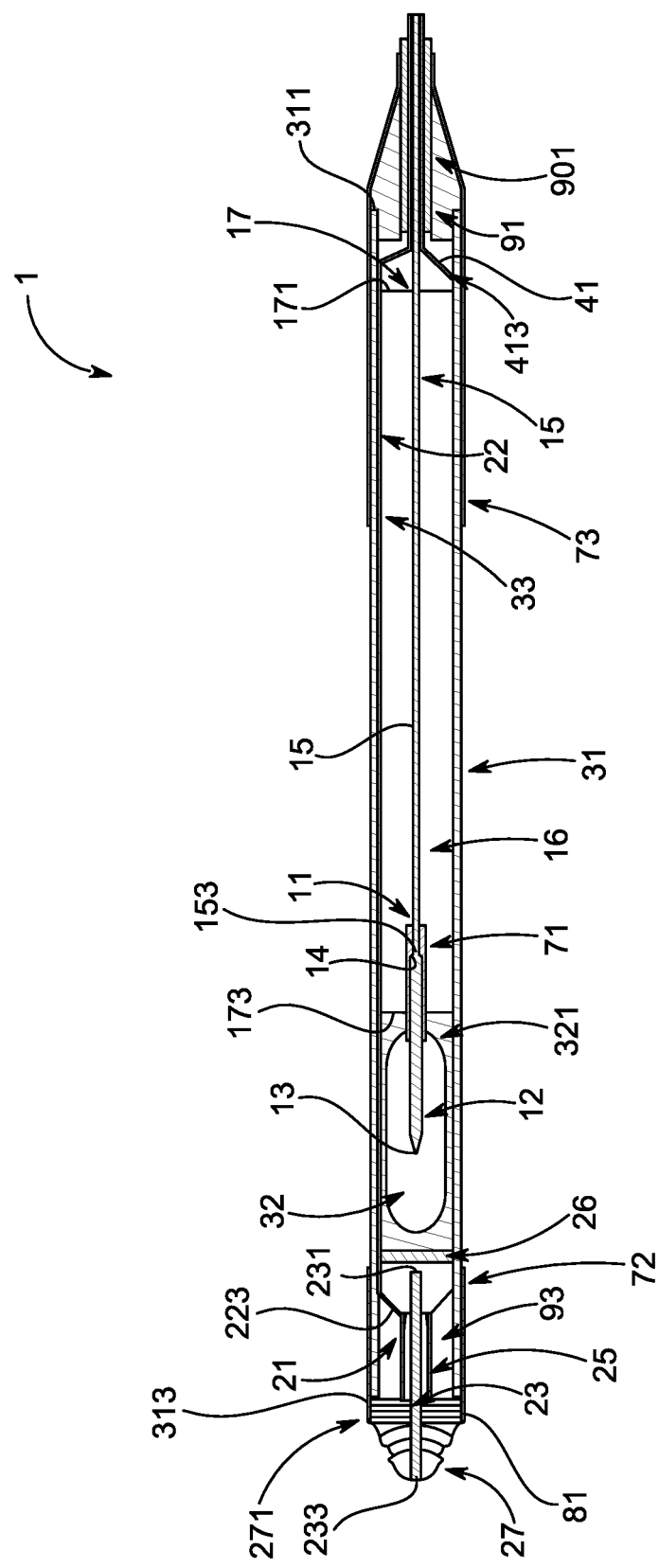
FIG. 5B is a detailed cross-sectional view of the measuring probe described in the present disclosure, wherein a level-measuring module and a base-measuring module are illustrated.
Figure 12A:
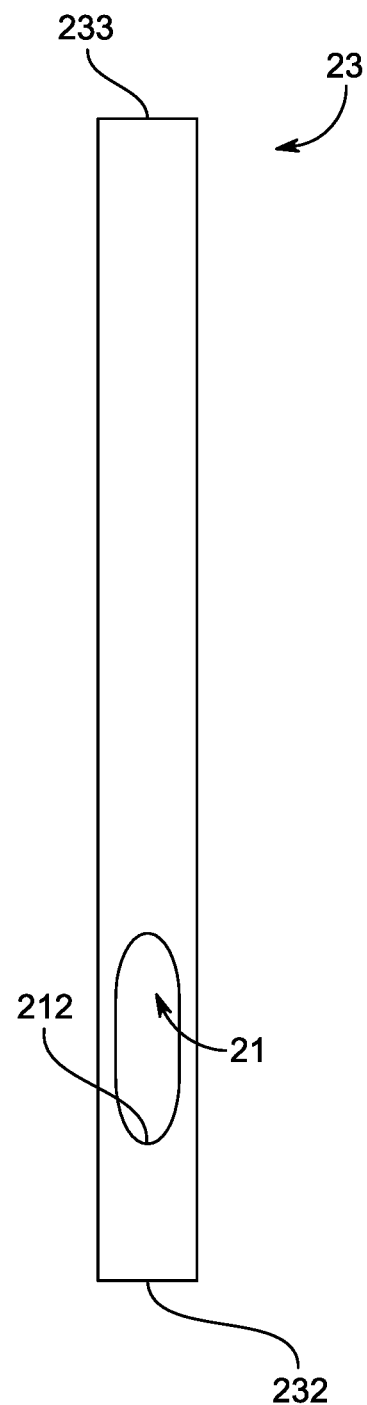
FIG. 12A is an illustration of a hollow cylindrical body of the measuring probe, wherein a first end, a fluid-passing slot, and a second end are illustrated.
Figure 12B:
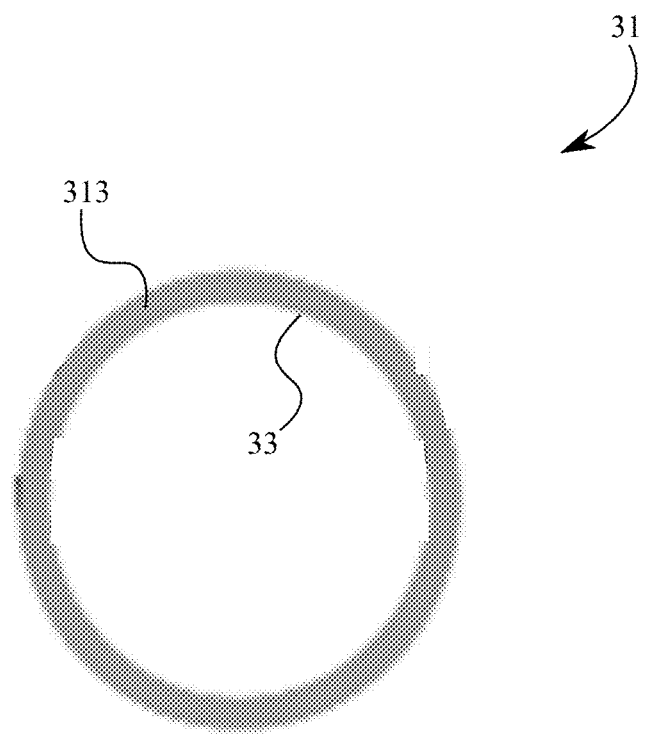
FIG. 12B is a bottom view of the hollow cylindrical body of the measuring probe, wherein the second end and an internal surface of the hollow cylindrical body are illustrated.

As seen in FIGS. 15A-16A, the water level and well depth measuring device of the present disclosure comprises a measuring probe 1, a control switch 2, a processing unit 3, an external power source 4, and a housing 5. As seen in FIG. 5B, the measuring probe 1 comprises a level-measuring module 11 to measure a depth to a water level within a well, and a base-measuring module 21 to measure a depth to a well bottom. Referring to FIG. 5B, FIG. 12A, and FIG. 12B, to sequentially measure a water level and a well depth using the measuring probe 1, the level-measuring module 11 and the base-measuring module 21 are integrated into a hollow cylindrical body 31 of the measuring probe 1.

Figure 15A:
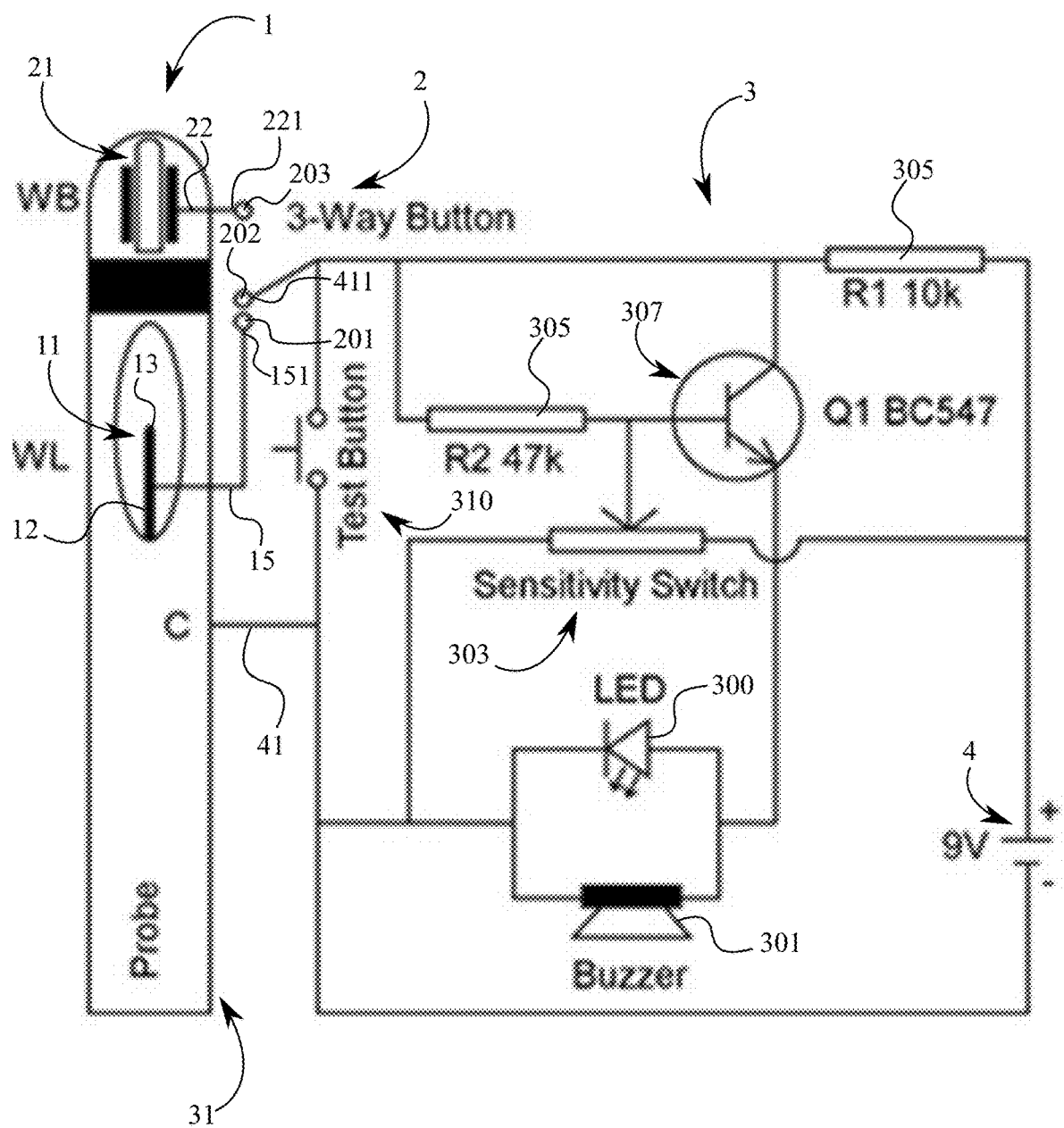
FIG. 15A is a circuit diagram illustrating the electrical connection between the measuring probe, a control switch, a processing unit, and an external power source of the water level and well depth measuring device described of the present disclosure.

In further reference to FIG. 15A, the control switch 2 is used to alternate between measuring the depth to the water level and measuring the depth to the well bottom. In contrast to an on-off switch utilized in existing depth measuring devices, as seen in FIG. 15A, the control switch 2 of the present disclosure is a three-way switch electronically connected to the measuring probe 1. More specifically, the switching configurations of the three-way switch allows to alternate between measuring the depth to the water level, the depth to the well bottom, and an off position where no measurements are performed.

Figure 5C:
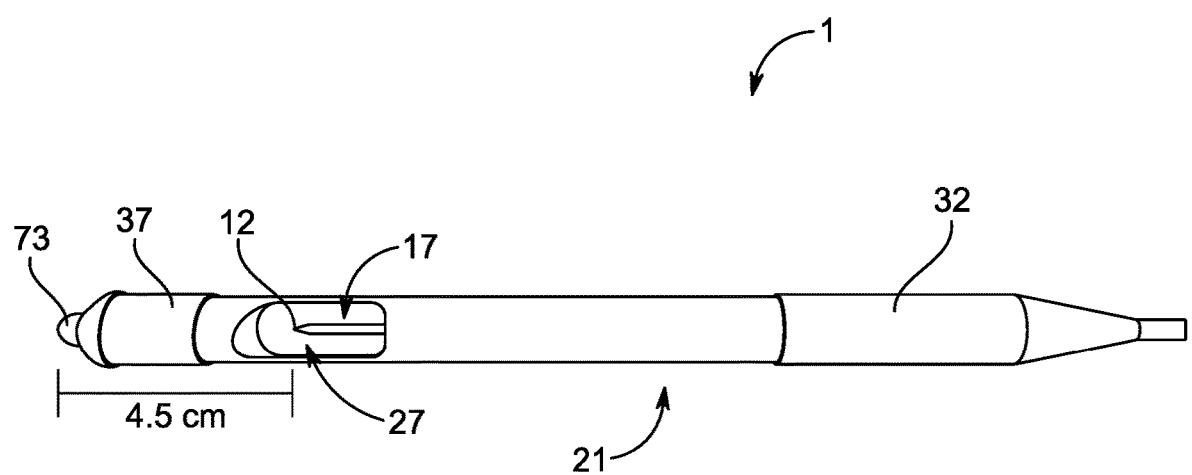
FIG. 5C is an illustration of the measuring probe described in the present disclosure, wherein a distance between a fluid-detecting pin of the level-measuring module and a collapsible cap of the base-measuring module is illustrated.

The processing unit 3, seen in FIG. 15A, is used to process a feedback signal received from the measuring probe 1, wherein the feedback signal is associated with either the depth to the water level or the depth to the well bottom. If the measuring probe 1, seen in FIGS. 5A-5C, is used to measure a depth to a water level, the feedback signal may be a level-detection signal. If the measuring probe 1, seen in FIGS. 5A-5C, is used to measure a depth to a well bottom, the feedback signal may be a base-detection signal. As seen in FIG. 15A, to receive the feedback signal, the processing unit 3 is communicably coupled with the measuring probe 1. In further reference to FIG. 15A, the processing unit 3 is electronically connected to the control switch 2 Thus, based on the switching selection of the control switch 2, the processing unit 3 may notify the user when a water level is reached or when a well bottom is contacted. In a preferred embodiment, as seen in FIG. 15A and FIG. 15B, to notify a user regarding a position of the measuring probe 1, for example, when the measuring probe 1 is at a water level or at the well bottom, the processing unit 3 comprises a visual indicator 300 and an audible alarm 301.

The processing unit 3 seen in FIG. 15A includes circuitry with program instructions to receive the level-detection signal from the level-measuring module 11 shown in FIG. 5B. More specifically, in reference to FIG. 15A, when the level measuring module 11 is selected from the control switch 2 and when the measuring probe is in contact with a conductive fluid, which is water in a preferred embodiment, a control circuit of the level-measuring module 11 is completed to activate the visual indicator 300 and the audible alarm 301. The visual indicator 300 may be, but is not limited to, at least one light-emitting diode. The audible alarm 301 may be, but is not limited to, at least one speaker. In a different embodiment, the processing unit 3 may include a notification mechanism that may be, but is not limited to, a vibration mechanism.

Referring to FIG. 5B and FIG. 15A, to measure a well depth, the base-measuring module 21 is selected using the control switch 2. If the visual indicator 300 and the audible alarm 301, seen in FIG. 15A and FIG. 15B, are activated prior to switching to the base-measuring module 21, the visual indicator 300 and the audible alarm 301 are subsequently deactivated at the time of switching from the level-measuring module 11 to the base-measuring module 21. The processing unit 3 shown in FIG. 15A further includes program instructions to receive the base-detection signal when the measuring probe 1 is in contact with a bottommost surface of a well. More specifically, referring to FIG. 5B, a control circuit of the base-measuring module 21 is completed upon contacting the bottommost surface of the well and the base-detection signal is initiated. Referring to FIG.

Figure 15B:
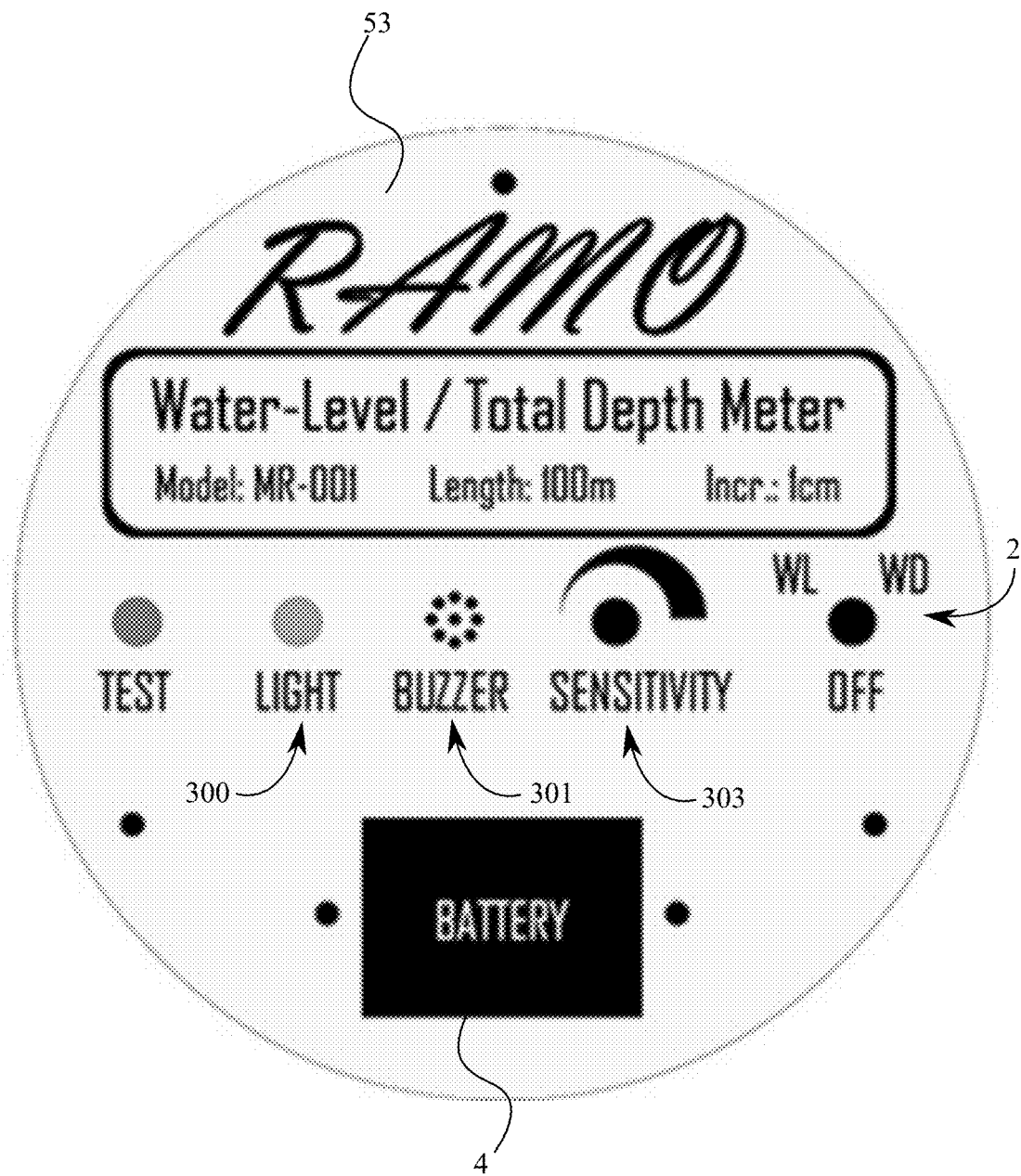
FIG. 15B is an illustration of a front panel, wherein the front panel conceals the visual indicator, the audible alarm, the control switch, and the processing unit within a housing.

15A and FIG. 15B, when the base-detection signal is received at the processing unit 3, the processing unit 3 activates the visual indicator 300 and the audible alarm 301.

In reference to FIG. 15A and FIG. 15B, the external power source 4 provides an operating voltage for the control circuit of the level-measuring module 11, the control circuit of the base-measuring module 21, the visual indicator 300, and the audible alarm 301. In a preferred embodiment, as seen in FIG. 15A, the external power source 4 is a 9-volt battery that is electronically connected to the measuring probe 1, the control switch 2, and the processing unit 3. In a different embodiment, a voltage provided by the external power source 4, shown in FIG. 15A and FIG. 15B, may vary. Furthermore, in a different embodiment, the external power source 4, shown in FIG. 15A and FIG. 15B, may be, but is not limited to, a renewable energy source.

As seen in FIG. 15A, in a preferred embodiment, to activate the visual indicator 300 and the audible alarm 301 based on the level-detection signal and the base-detection signal, the processing unit 3 further comprises a sensitivity switch 303, a plurality of resistors 305, and at least one transistor 307 which are electronically connected to each other in series. The plurality of resistors 305 and the at least one transistor 307, seen in FIG. 15A, may be used to regulate and amplify the level-detection signal and the base-detection signal. In a preferred embodiment, the sensitivity switch 303, seen in FIG. 15A, is a potentiometer. The sensitivity switch 303 may be used to configure the water level and well depth measuring device of the present disclosure when the conductivity of the water varies from one well to another. Conductivity is a measure of the ability of water to pass an electrical current. Conductivity in water is affected by the presence of inorganic dissolved solids such as chloride, nitrate, sulfate, and phosphate anions, which carry a negative charge, or sodium, magnesium, calcium, iron, and aluminum cations which carry a positive charge. For simulation purposes, as illustrated in FIG. 15A, a test button 310 may also be integrated into the processing unit 3. In particular, in one aspect, the test button 310 may be used to simulate the measuring probe 1, seen in FIGS. 5A-5C, being at the water level. In another aspect, the test button 310 may be used to simulate the measuring probe 1, seen in FIGS. 5A-5C, being in contact with the bottommost surface of the well.

As seen in FIG. 15A, in a preferred embodiment, a BC547 transistor which is a negative-positive-negative (NPN) transistor is used as the at least one transistor 307. However, in other embodiments, a comparable transistor that may be, but is not limited to, a BC337 transistor, a 2N3904 transistor, a 2N4401 transistor, and a 2N2222 transistor may also be used as the at least one transistor 307 shown in FIG. 15A. Furthermore, in a different embodiment, a complimentary positive-negative-positive (PNP) transistor such as a BC557 transistor may also be used as the at least one transistor 307 shown in FIG. 15A. In a preferred embodiment, as seen in FIG. 15A, the plurality of resistors 305 includes a first resistor and a second resistor. A first resistor is preferably within a range of 5 KiloOhms (K)-25K, 5K-15K, with a preferable resistance of about 10K. A second resistor is preferably within a range of 40K-60K, 45K-55K, with a preferable resistance of about 47K.

Generally, the sensitivity switch 303, shown in FIG. 15A, utilizes variable resistance. To configure the sensitivity switch 303 as required for the well, as an initial step, a sensitivity of the sensitivity switch 303 is increased to activate the visual indicator 300 and the audible alarm 301 when the measuring probe 1 is not positioned in the well. As a subsequent step, the sensitivity is marginally decreased to deactivate the visual indicator 300 and the audible alarm 301 seen in FIG. 15A.

Figure 16A:
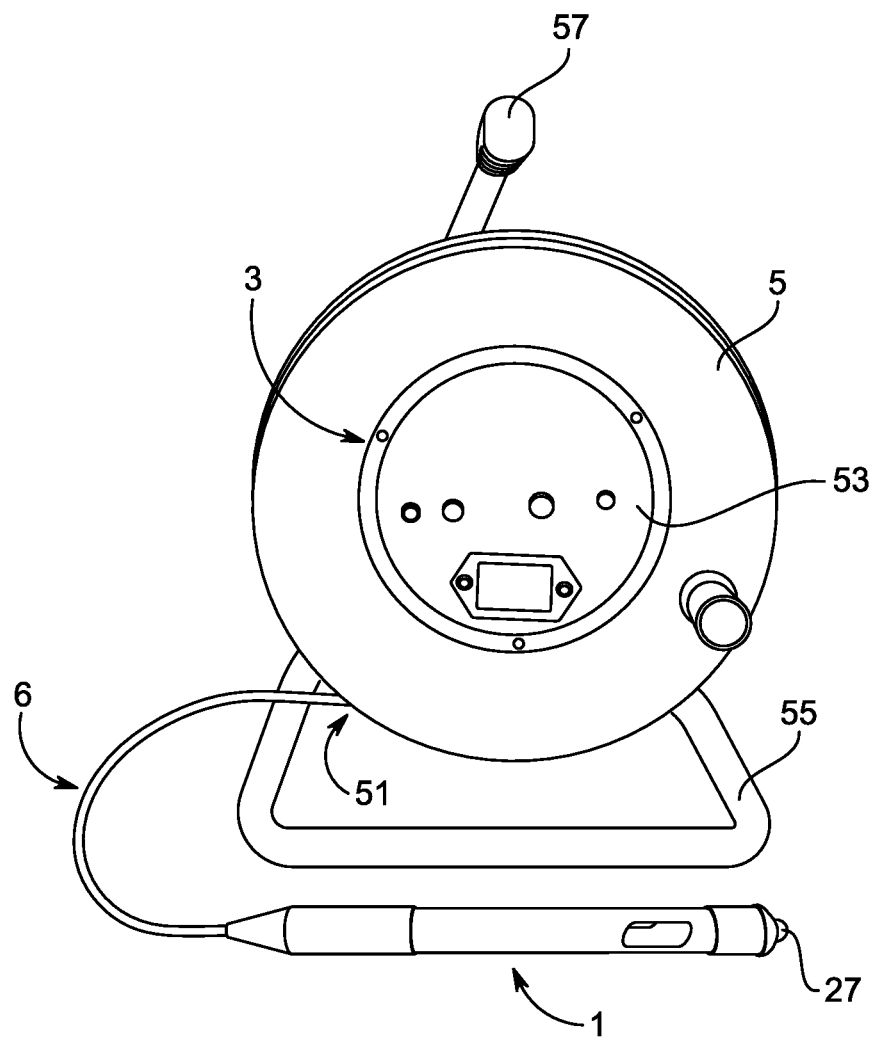
FIG. 16A is a front view of the water level and well depth measuring device of the present disclosure.
Figure 16B:
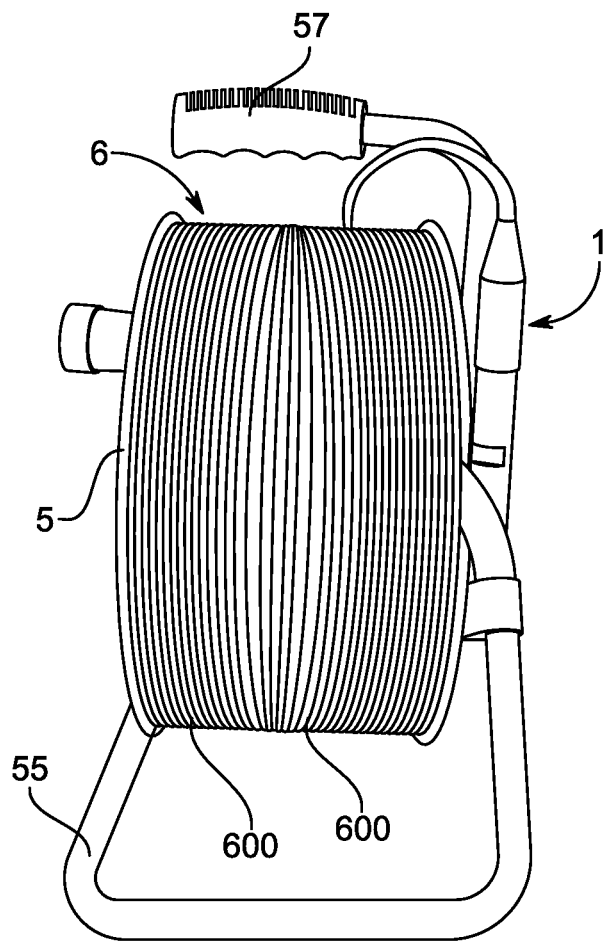
FIG. 16B is a side view of the water level and well depth measuring device of the present disclosure, wherein an insulated cable connecting the measuring probe and the housing is wrapped around a circular structural body of the housing.
Figure 16C:
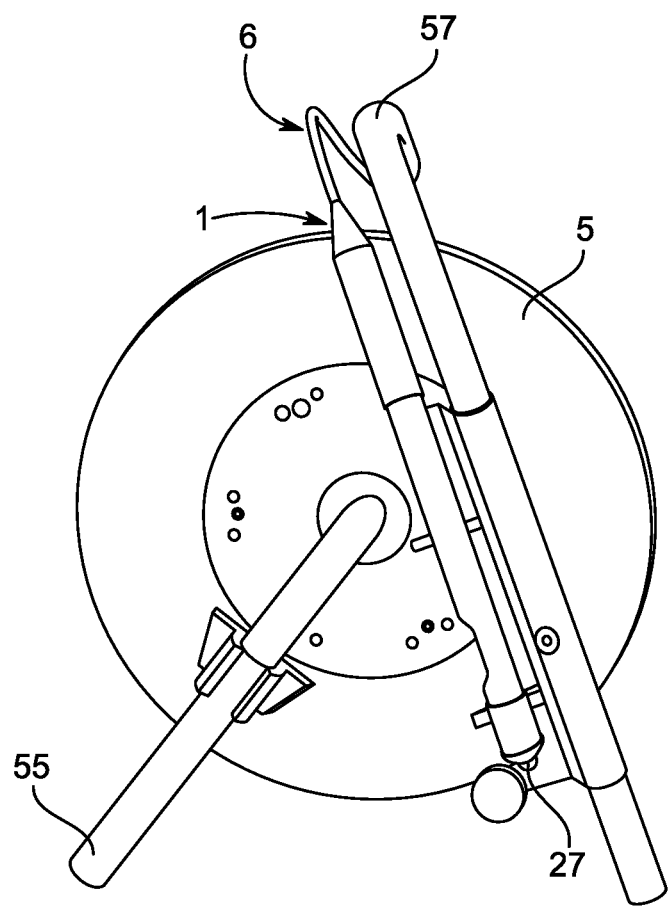
FIG. 16C is a rear view of the water level and well depth measuring device of the present disclosure.

When the water level and well depth measuring device of the present disclosure is in use, the housing 5, seen in FIGS. 16A-16C, is positioned at a ground level adjacent an opening of the well such that the measuring probe 1 may be released into the well. Preferably, as seen in FIGS. 16A-16C, an insulated cable 6 is used to connect the housing 5 and the measuring probe 1. Thus, as seen in FIGS. 15A-16A, the control switch 2, the processing unit 3, and the external power source 4, which are integrated into a structural body of the housing 5, may be electronically connected to the measuring probe via an outlet 51 of the housing 5, wherein the insulated cable 6 is connected to the outlet 51.

Figure 17:
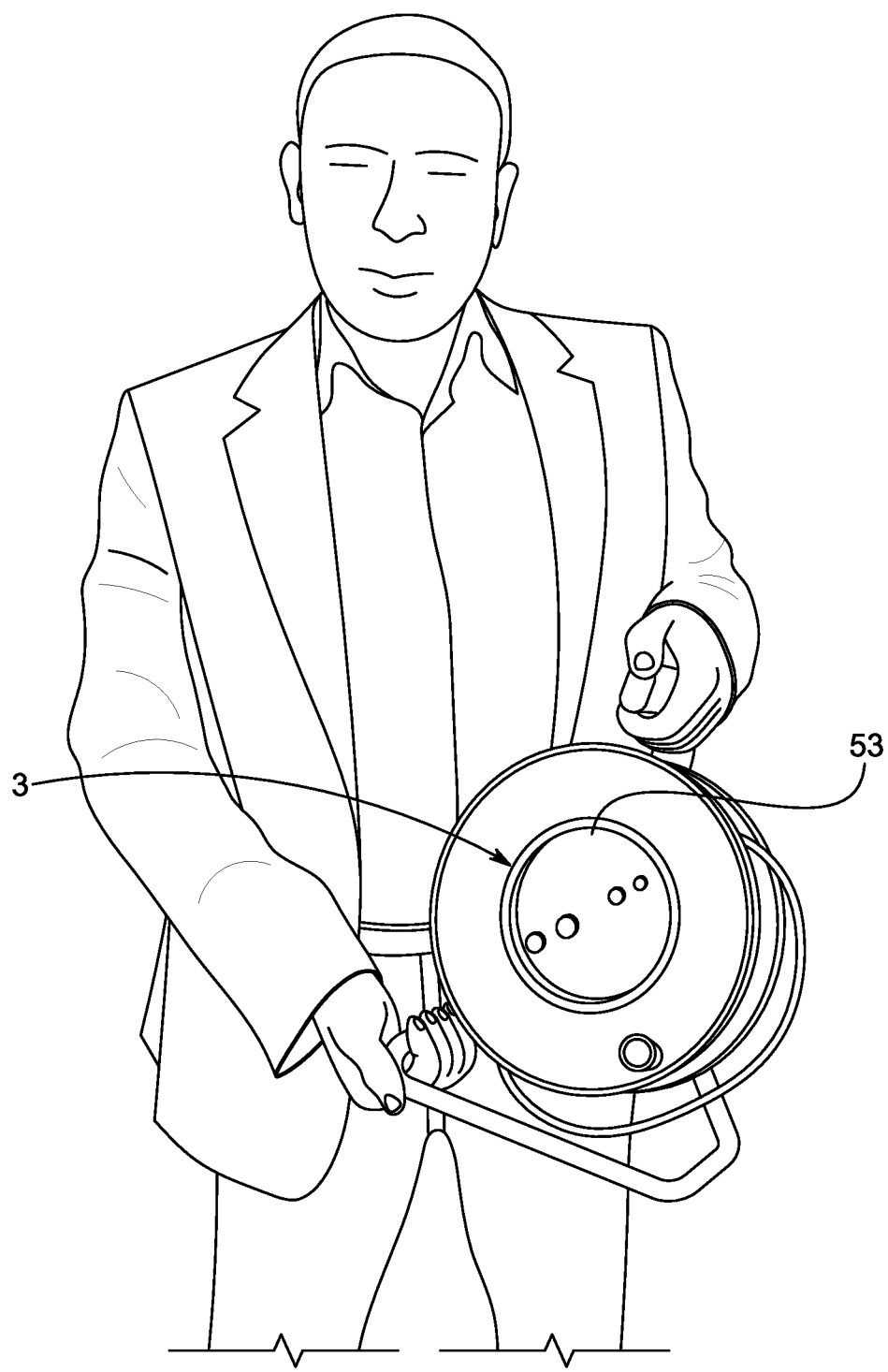
FIG. 17 is an illustration of a prototype of the water level and well depth measuring device of the present disclosure.

In a preferred embodiment, as seen in FIG. 15B, FIG. 16A, and FIG. 17, at least one acrylic sheet may be used as a front panel 53, wherein the front panel 53 may conceal the processing unit 3 and the external power source 4 within the housing 5. Preferably, a thickness of the front panel 53, shown in FIG. 15B and FIG. 16A, may be within a range of 1 millimeters (mm)-3 mm, 1.25 mm-2.75 mm, with a preferable thickness within a range of 1.75 mm-2.5 mm. As further seen in FIG. 15B and FIG. 16A, the control switch 2 may be externally integrated into the front panel 53 of the housing 5. As seen in FIG. 15B, the visual indicator 300 and the audible alarm 301 of the processing unit 3 may protrude outwards through the front panel 53. Preferably, the housing 5, seen in FIGS. 16A-16C, is manufactured from a material that may be, but is not limited to, galvanized steel. When not in use, the insulated cable 6 is preferably wrapped around a circular structural body of the housing 5 as shown in FIG. In a preferred embodiment, as seen in FIGS. 16A-16C, the housing 5 may include a base section 55 for positioning purposes. Furthermore, in a preferred embodiment, the housing 5 may include a handle 57 for handling purposes. A reel brake mechanism may also be integrated into the structural body of the housing 5 to control the release of the insulated cable 6 into the well.

As illustrated in FIG. 5B and FIG. 15A, the water level and well depth measuring device of the present disclosure comprises a mutual wire 41 that allows the control switch 2 to alternate between the level-measuring module 11 and the base-measuring module 21. As seen in FIG. 15A, a first end 411 of the mutual wire 41 is connected to a second terminal 202 of the control switch 2, and as seen in FIG. 5B, a second end 413 of the mutual wire 41 is connected to an internal surface 33 of the hollow cylindrical body 31, wherein the cylindrical body 31 is further illustrated in FIG. 12A and FIG. 12B. Furthermore, as seen in FIG. 15A, a first terminal 201 of the control switch 2 is electrically connected to the level-measuring module 11, and a third terminal 203 of the control switch 2 is electrically connected to the base-measuring module 21. A diameter of the mutual wire 41 seen in FIG. 5B, which is preferably a copper wire, is within a range of 0.5 millimeters (mm)-2.5 mm, 0.75 mm-1.5 mm, with a preferable diameter of about 1 mm. In further reference to FIG. 5B, when the second end 413 of the mutual wire 41 is connected to the internal surface 33 of the hollow cylindrical body 31, a distance from a first end 311 of the hollow cylindrical body 31 to the second end 413 of the mutual wire 41 is within a range of 8 mm-12 mm, 9 mm-11 mm, with a preferable distance of about 10 mm.

Preferably, the hollow cylindrical body 31, shown in FIG. 12A and FIG. 12B, is manufactured from an electrically conductive material such as stainless steel. However, in other embodiments, a different material that may be, but is not limited to, aluminum and brass may be used for the hollow cylindrical body 31 of FIG. 12A and FIG. 12B. In a preferred embodiment, referring to FIG. 12A, a length of the hollow cylindrical body 31 is within a range of 150 mm-250 mm, 175 mm-225 mm, with a preferable length of about 190 mm. Referring to FIG. 12B, an outer diameter of the hollow cylindrical body 31 is within a range of 10 mm-18 mm, 12 mm-16 mm, with a preferable outer diameter within a range of 13 mm-15 mm. An inner diameter of the hollow cylindrical body 31 is within a range of 8 mm-16 mm, 10 mm-12 mm, with a preferable inner diameter within a range of 11 mm-13 mm. A wall thickness of the hollow cylindrical body 31 is within a range of 1 mm-8 mm, 1.5 mm-6 mm, with a preferable wall thickness of about 2 mm.

As seen in FIG. 5B and FIG. 12A, in a preferred embodiment, a fluid-passing slot 32 is formed within the hollow cylindrical body 31, wherein the fluid-passing slot 32 is used when measuring the depth to the water level. In particular, when the measuring probe 1 of FIGS. 5A-5C is at the water level, the water flows through the fluid-passing slot 32 conducting electricity from the open end 13 of the fluid-detecting pin 12 to the internal surface 33 of the hollow cylindrical body 31. Preferably, as seen in FIG. 12A, the fluid-passing slot 32 is positioned adjacent a second end 313 of the hollow cylindrical body 31. In a preferred embodiment, as shown in FIG. 5B, the fluid-passing slot 32 is oval in shape and is perimetrically surrounded with adhesive epoxy 321 for sealing purposes. The adhesive epoxy may be, but is not limited to, a cycloaliphatic epoxy resin. In a preferred embodiment, 1,2-Cyclohexanedicarboxylic acid, bis(2,3-epoxypropyl) ester, in combination with cycloaliphatic dicarboxylic anhydrides and silanized silica flour may be used as the cycloaliphatic epoxy resin.

A length of the fluid-passing slot 32, shown in FIG. 5B and FIG. 12A, is within a range of 25 mm-35 mm, 27 mm-32 mm, with a preferable length of about 28 mm. In a preferred embodiment, as seen in FIG. 12A, a distance from a distal vertex 323 of the fluid-passing slot 32 to the second end 313 of the hollow cylindrical body 31, wherein the distal vertex 323 is positioned adjacent the second end 313 of the hollow cylindrical body 31, is within a range of 16 mm-24 mm, 18 mm-22 mm, with a preferable distance of about 21 mm.

Figure 11A:
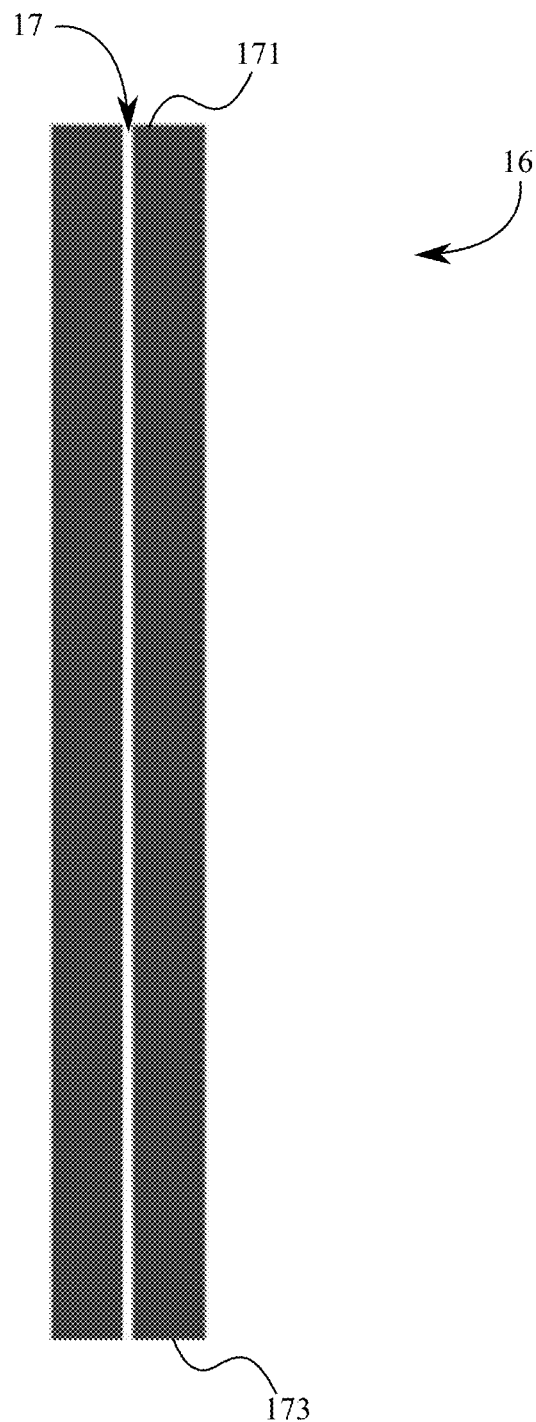
FIG. 11A is a cross-sectional view of a cylindrical block of the level-measuring module, wherein a first end, a positioning channel, and a second end are illustrated.
Figure 11B:
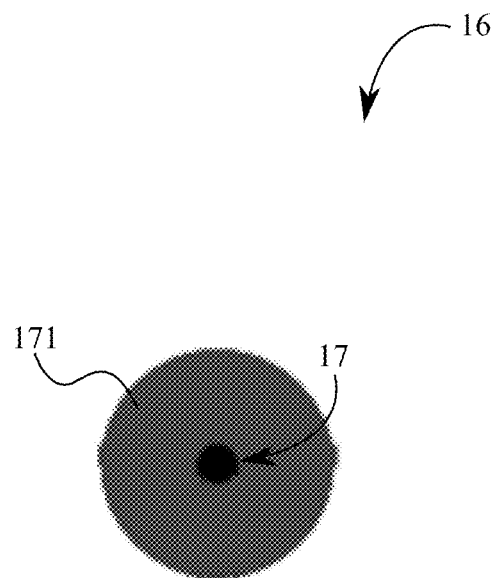
FIG. 11B is a top view of the cylindrical block of the level-measuring module, wherein the first end and the positioning channel are illustrated.

In a preferred embodiment, as seen in FIG. 5B, the level-measuring module 11 comprises a fluid-detecting pin 12, a water level-detecting wire 15, and a cylindrical block 16. In further reference to FIG. 5B, the cylindrical block 16, which is preferably manufactured from lead, is positioned within the hollow cylindrical body 31 in between the first end 311 of the hollow cylindrical body 31 and the fluid-passing slot 32. A length of the cylindrical block 16, shown in FIG. 5B, is within a range of 80 mm-120 mm, 90 mm-110 mm, with a preferable length within a range of 95 mm-105 mm. A positioning channel 17 formed within the cylindrical block 16, as seen in FIG. 5B, FIG. 11A, and FIG. 11B, is used to position the fluid-detecting pin 12 in the fluid-passing slot 32 such that the control circuit of the level-measuring module 11 may be completed at the water level of the well. In further reference to FIG. 5B, to be exposed to the water level within the fluid-passing slot 32, the fluid-detecting pin 12 is partially positioned into a second end 173 of the positioning channel 17 such that an open end 13 of the fluid-detecting pin 12 extends outwards into the fluid-passing slot 32. In further reference to FIG. 5B, a concealed end 14 of the fluid-detecting pin 12 may be positioned within the positioning channel 17 where the fluid-detecting pin 12 is electrically connected to a second end 153 of the water level-detecting wire 15. More specifically, as shown in FIG. 15A, a first end 151 of the water level-detecting wire 15 is connected to the first terminal 201 of the control switch 2 and as seen in FIG. 5B, the second end 153 of the water level-detecting wire is positioned into the positioning channel 17 and electrically connected to the concealed end 14 of the fluid-detecting pin 12 within the positioning channel 17. A diameter of the positioning channel 17, shown in FIG. 11A, is within a range of 0.5 mm-2.5 mm, 1 mm-2 mm, with a preferable diameter within a range of 1.25 mm-1.75 mm. Preferably, in further reference to FIG. 5B, the concealed end 14 of the fluid-detecting pin 12 and the second end 153 of the water level-detecting wire 15 are perimetrically sleeved by a first heat shrink insulator 71 to insulate a connection point between the concealed end 14 and the second end 153 of the water level-detecting wire 15. Preferably, the first heat shrink insulator 71 is flexible, highly flame retardant, includes a wide shrink ratio, and includes a high melting temperature. A polyolefin heat shrink or an adhesive lined heat shrink may be used as the first heat shrink insulator 71 shown in FIG. 5B. A shrinking temperature of polyolefin shrink insulator is about 100-Celcius (° C.), and may withstand temperatures within a temperature range of 125° C.-135° C. Generally, an adhesive lined heat shrink insulator includes two layers, an outer layer and an inner layer. The outer layer is manufactured from polyolefin and the inner layer is manufactured from an adhesive that melts and flows at a shrinking temperature of the outer layer. Thus, the adhesive flows to fill any voids and to obtain a shape of body that is being insulated.

Figure 10A:
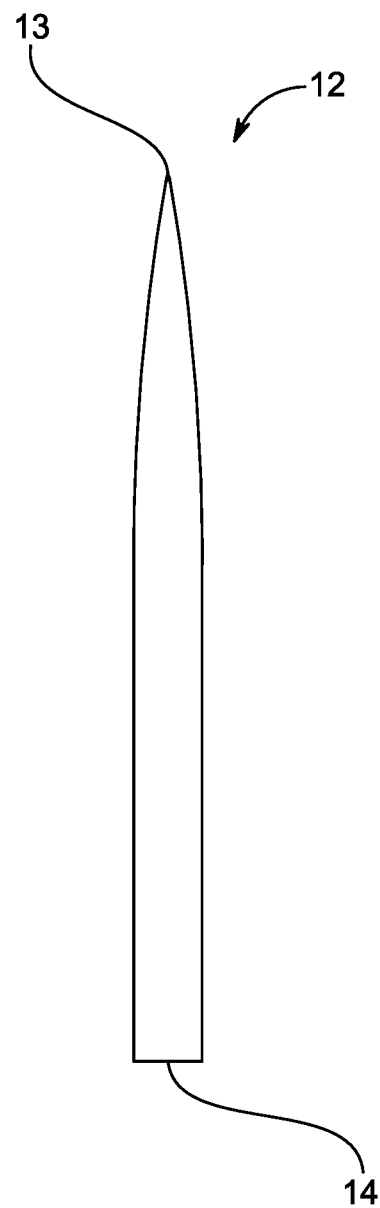
FIG. 10A is an illustration of a fluid-detecting pin of the level-measuring module, wherein an open end and a concealed end are illustrated.
Figure 10B:
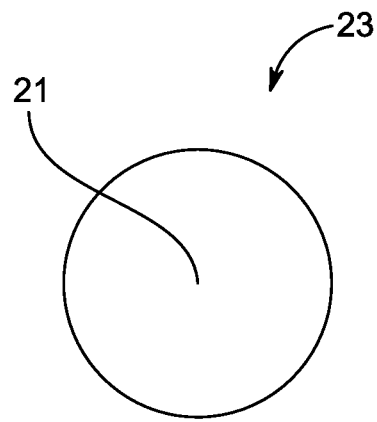
FIG. 10B is a top view of the fluid-detecting pin of the level-measuring module, wherein the open end of the fluid-detecting pin is illustrated.

In a preferred embodiment, the fluid-detecting pin 12, seen in FIG. 10A and FIG. 10B, is manufactured from stainless steel and has a length within a range of 22 mm-32 mm, 25 mm-30 mm, with a preferable length of about 27 mm. A diameter of the fluid-detecting pin 12, seen in FIG. 10A and FIG. 10B, is within a range of 1.5 mm-3 mm, 1.75 mm-2.50 mm, with a preferable diameter of about 2 mm. In a preferred embodiment, as seen in FIG. 5B, a length within a range of 10 mm-18 mm, 12 mm-16 mm, with a preferable length of about 14 mm of the fluid-detecting pin 12 is exposed for fluid detection purposes within the fluid-passing slot 32.

When the fluid-passing slot 32, seen in FIG. 5B, is exposed to the conductive fluid, which is water in a preferred embodiment, the control circuit of the level-measuring module 11 is completed by conducting electricity from the open end 13 of the fluid-detecting pin 12 to the internal surface 33 of the hollow cylindrical body 31 shown in FIG. 12B. As illustrated in FIG. 5B, the second end 413 of the mutual wire 41 is connected to the internal surface 33. Thus, referring to FIG. 5B and FIG. 15A, the first terminal 201 of the control switch 2, the water level-detecting wire 15, the fluid-detecting pin 12, the internal surface 33 of the hollow cylindrical body 31, and the mutual wire 41 are electronically connected to complete the control circuit of the level-measuring module 11. As a result, the visual indicator 300 and the audible alarm 301, seen in FIG. 15A and FIG. 15B, are triggered to notify the user regarding the water level. Thus, the depth to the water level may be measured using the insulated cable 6.

Figure 9A:
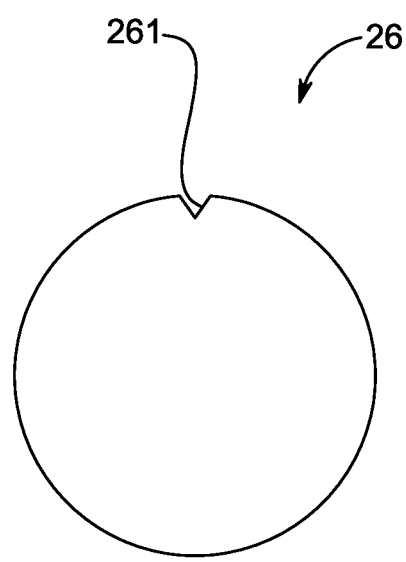
FIG. 9A is an illustration of a conductive disk of the base-measuring module, wherein a positioning groove is formed along a perimeter of the conductive disk.
Figure 9B:
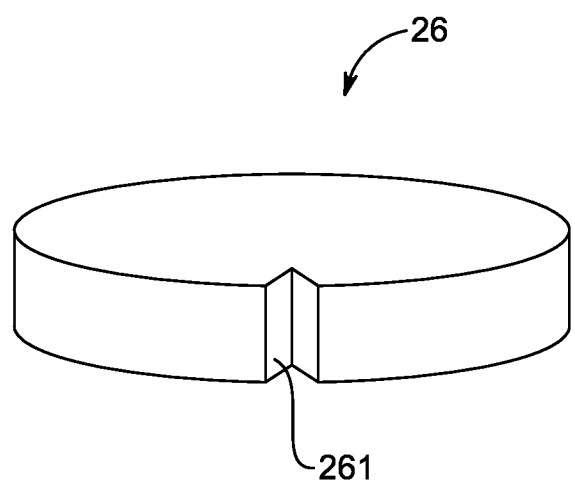
FIG. 9B is a perspective view of the conductive disk, wherein the positioning groove is illustrated.

Referring to FIG. 5B, in a preferred embodiment, the base-measuring module 21 comprises a well depth-detecting wire 22, a conductive rod 23, a conductive tube 25, a conductive disk 26, and a collapsible cap 27 which are used to establish an electrical path that completes the control circuit of the base-measuring module 21. As shown in FIG. 5B, FIG. 9A, and FIG. 9B, the conductive disk 26, which is preferably manufactured from copper, is concentrically aligned with the hollow cylindrical body 31 and positioned adjacent a second end 313 of the hollow cylindrical body 31. Further referring to FIG. 5B, the conductive disk 26 may be positioned in between the fluid-passing slot 32 and the second end 313 of the hollow cylindrical body 31. Preferably, the conductive disk 26 is positioned adjacent the distal vertex 323 of the fluid-passing slot 32 seen in FIG. 12A. As shown in FIG. 5B, to snugly fit within the hollow cylindrical body 31, a diameter of the conductive disk 26 is within a range of 8 mm-16 mm, 10 mm-12 mm, with a preferable diameter within a range of 11 mm-13 mm. A thickness of the conductive disk 26 is within a range of 1 mm-3 mm, 1.5 mm-2.5 mm, with a preferable thickness of about 2 mm.

Figure 8A:
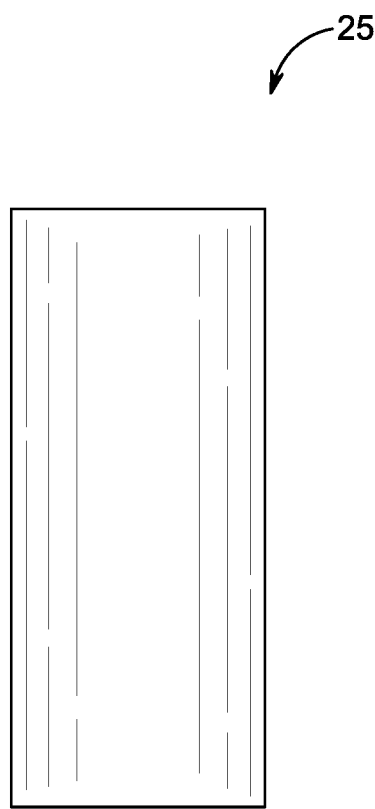
FIG. 8A is an illustration of a conductive tube of the base-measuring module.
Figure 8B:
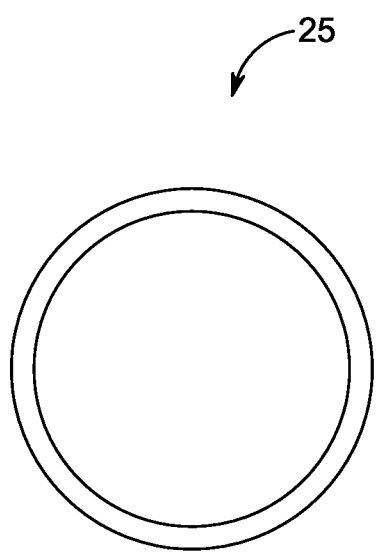
FIG. 8B is a bottom view of the conductive tube of the base-measuring module.

In reference to FIG. 8A and FIG. 8B, the conductive tube 25, which is preferably manufactured from copper, is concentrically aligned with the hollow cylindrical body 31 and inserted into the second end 313 of the hollow cylindrical body 31 as seen in FIG. 5B. As further illustrated in FIG. 5B, the conductive rod 23, which is also preferably manufactured from copper, is slidably positioned into the conductive tube 25 at the second end 313 of the hollow cylindrical body 31. In a preferred embodiment, a length of the conductive tube 25 is within a range of 8 mm-16 mm, 10 mm-14 mm, with a preferable length of about 10 mm-13 mm. An inner diameter of the conductive tube 25 is within a range of 2 mm-8 mm, 3 mm-7 mm, with a preferable inner diameter within a range of 3.5 mm-5.5 mm.

Figure 7A:
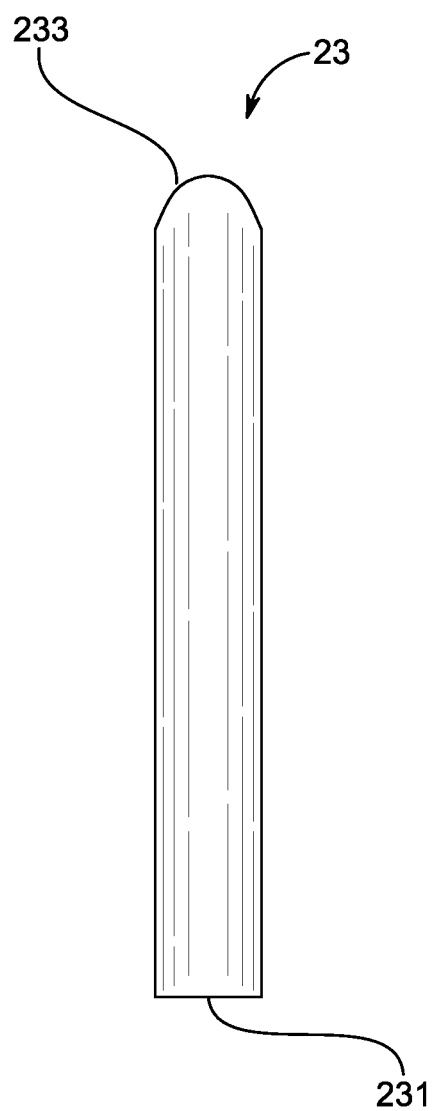
FIG. 7A is an illustration of a conductive rod of the base-measuring module.
Figure 7B:
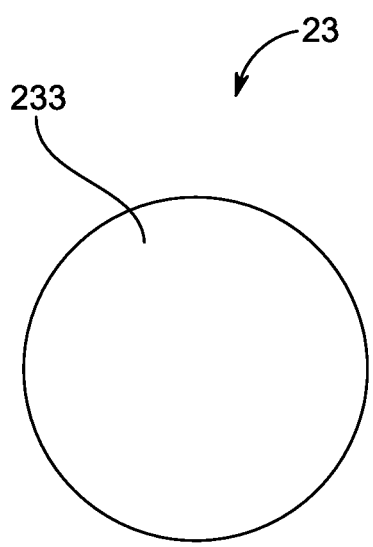
FIG. 7B is a top view of the conductive rod of the base-measuring module, wherein an external end of the conductive rod is illustrated.

As seen in FIG. 5B, a length of the conductive rod 23 is greater than a length of the conductive tube 25 such that a portion of the conductive rod 23 extends beyond the conductive tube 25. In particular, referring to FIG. 5B, FIG. 7A and FIG. 7B, an external end 233 of the conductive rod 23 extends beyond the second end 313 of the hollow cylindrical body 31 whereas an internal end 231 of the conductive rod 23 is positioned in between the second end 313 of the hollow cylindrical body 31 and the conductive disk 26. In a preferred embodiment, as seen in FIG. 7A, the external end 233 of the conductive rod 23 is rounded. As shown in FIG. 5B, when the conductive rod 23 is positioned into the conductive tube 25, the conductive rod 23 is oriented perpendicular to the conductive disk 26 and is concentrically aligned the conductive disk 26. In a preferred embodiment, a length of the conductive rod 23, shown in FIG. 7A, is within a range of 20 mm-35 mm, 22 mm-32 mm, with a preferable length within a range of 25 mm-30 mm. Referring to FIG. 5B, to slide along the conductive tube 25, a diameter of the conductive rod 23 is within a range of 3 mm-7 mm, 3.5 mm-6.5 mm, with a preferable diameter of within a range of 4 mm-5 mm.

Figure 6A:
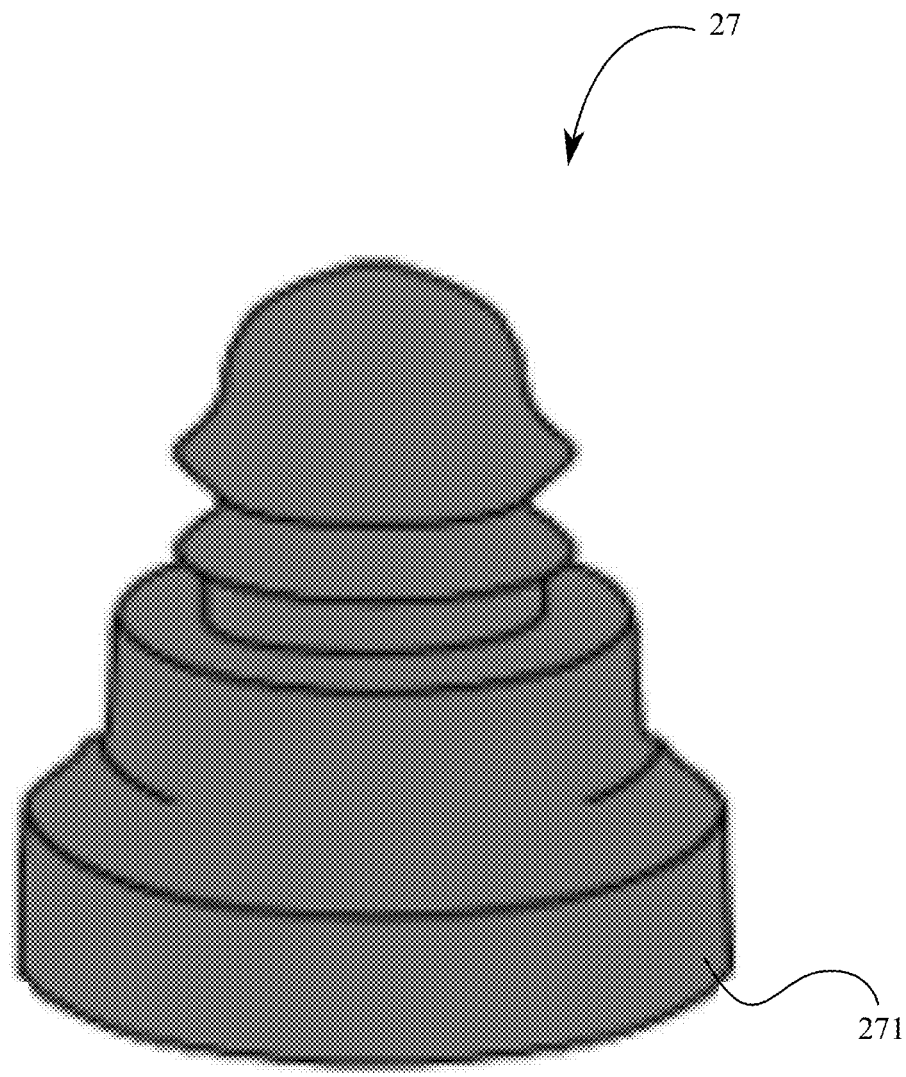
FIG. 6A is an illustration of the collapsible cap of the base-measuring module.
Figure 6B:
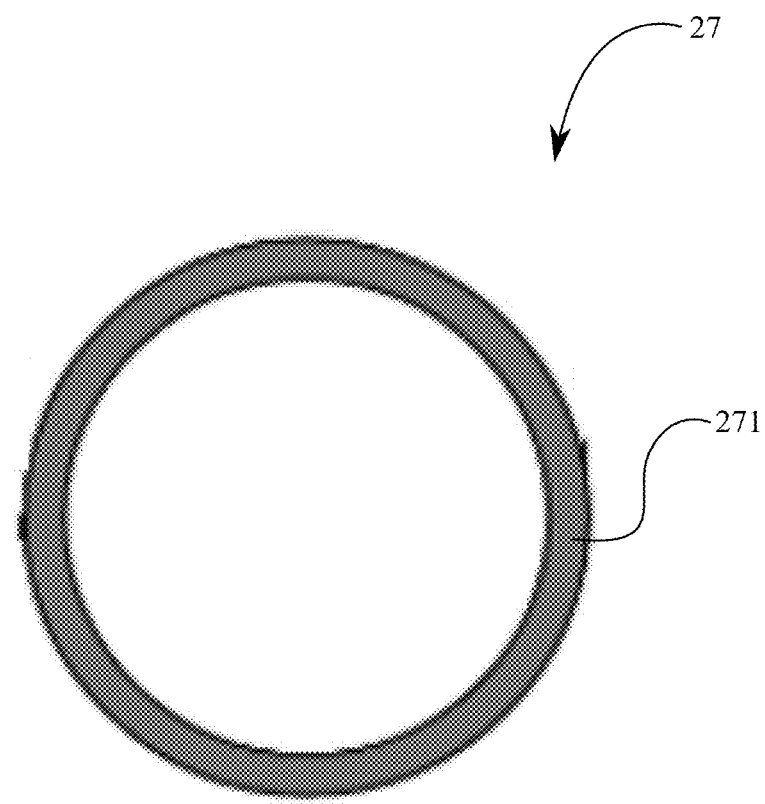
FIG. 6B is a bottom view of the collapsible cap of the base-measuring module, wherein a base section of the collapsible cap is illustrated.

When the measuring probe 1, shown in FIGS. 16A-16C, is lowered into the well in a vertical orientation with the insulated cable 6, the collapsible cap 27, shown in FIGS. 5A-6B, makes initial physical contact with the well bottom. As seen in FIGS. 5A-5C, the collapsible cap 27 is positioned adjacent the second end 313 of the hollow cylindrical body 31, and is positioned over the external end 233 of the conductive rod 23. In a preferred embodiment, the collapsible cap 27, shown in FIG. 6A and FIG. 6B, is a waterproof rubber cap, and is positioned adjacent the second end 313 of the hollow cylindrical body 31 with an attachment mechanism that may be, but is not limited to, a plurality of grooves or a clip-on mechanism. Materials that may be, but are not limited to, Ethylene Propylene Diene Monomer (EPDM) rubber and Fluorosilicone rubber may be used in the collapsible cap 27 shown in FIGS. 5A-6B. As seen in FIGS. 5A-5C, a second heat shrink insulator 72 perimetrically sleeves a base section 271 of the collapsible cap 27 and the second end 313 of the hollow cylindrical body 31. Referring to FIGS. 5A-5C, to allow the collapsible cap 27 to be in the collapsed configuration, the second heat insulator 72 is preferably semi-rigid. A polyolefin heat shrink or an adhesive lined heat shrink may be used in the second heat shrink insulator 72 seen in FIGS. 5A-5C.

When the measuring probe 1, seen in FIGS. 16A-16C, is lowered into the well, the collapsible cap 27 is in an expanded configuration. In reference to FIG. 5B, due to the arrangement of the conductive rod 23, the conductive tube 25, and the conductive disk 26, a collapsed configuration of the collapsible cap 27 may push the conductive rod 23 at the external end 233 towards the conductive disk 26, wherein the collapsible configuration is obtained when the collapsible cap 27 contacts the well bottom. As a result, further referring to FIG. 5B, the conductive rod 23 slides along the conductive tube 25 and may contact the conductive disk 26 to complete the control circuit of the level-measuring module 11.

As seen in FIG. 5C, when the collapsible cap 27 is in the expanded configuration, a distance between the collapsible cap 27 and the open end 13 of the fluid-detecting pin 12 is within a range of 3 centimeters (cm)-6 cm, 4 cm-5 cm, and a preferable range of 4.25 cm-4.75 cm. Therefore, when determining a well depth reading using the insulated cable 6 shown in FIG. 16A and FIG. 16B, the distance between the collapsible cap 27 and the open end 13 of the fluid-detecting pin 12 may have to be included in the well depth reading.

As shown in FIG. 5B, the well depth-detecting wire 22 is positioned along an internal surface 33 of the hollow cylindrical body 31 and positioned through a positioning groove 261 formed along a perimeter of the conductive disk 26 as seen in FIG. 9A. In a preferred embodiment, a diameter of the positioning groove 261, seen in FIG. 9A, is within a range of 0.5 mm-2 mm, with a preferable diameter of about 1 mm. Referring to FIG. 15A, a first end 221 of the well depth-detecting wire 22 is electronically connected to the third terminal 203 of the control switch 2, and as seen in FIG. 5B, a second end 223 of the well depth-detecting wire 22 is connected to the conductive tube 25. In a preferred embodiment, referring to FIG. 5B, the second end 223 of the well depth-detecting wire 22 is soldered to the conductive tube 25. As further illustrated in FIG. 5B, a portion of the well depth-detecting wire 22 extending from the first end 311 of the hollow cylindrical body 31 to the fluid-passing slot 32 is positioned in between the cylindrical block 16 and the internal surface 33.

In reference to FIG. 5B, when the collapsible cap 27 is in the collapsed configuration pushing the conductive rod 23 towards the conductive disk 26, the physical connection between the conductive tube 25, the conductive rod 23, and the conductive disk 26 completes the control circuit of the base-measuring module 21. More specifically, referring to FIG. 5B and FIG. 15A, in the collapsed configuration of the collapsible cap 27, the third terminal 203 of the control switch 2, the well depth-detecting wire 22, the conductive tube 25, the conductive rod 23, the conductive disk 26, and the internal surface 33 of the hollow cylindrical body 31, which is electrically connected to the second terminal 202 of the control switch 2 through the mutual wire 41, are electronically connected to each other. As a result, the visual indicator 300 and the audible alarm 301, seen in FIG. 15A and FIG. 15B, are triggered to notify the user that the measuring probe 1, seen in FIGS. 16A-16C, has contacted the bottommost surface of the well. Thus, the depth to the well bottom may be measured using the insulated cable 6.

Figure 13A:
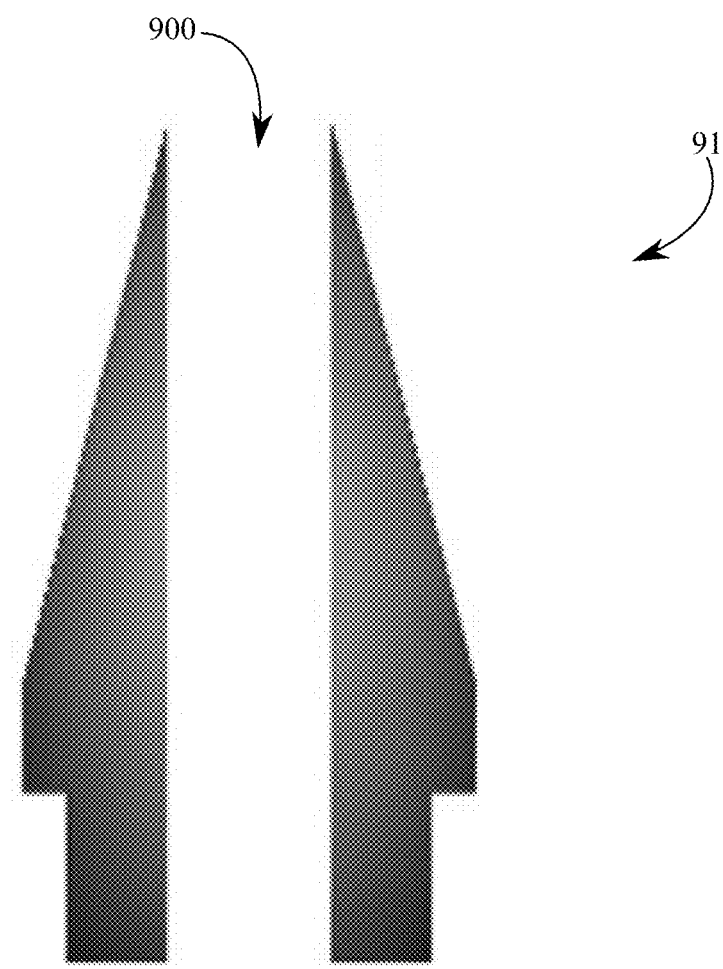
FIG. 13A is a cross-sectional view of a first fiber covering, wherein a receiving channel of the first fiber covering is illustrated.
Figure 13B:
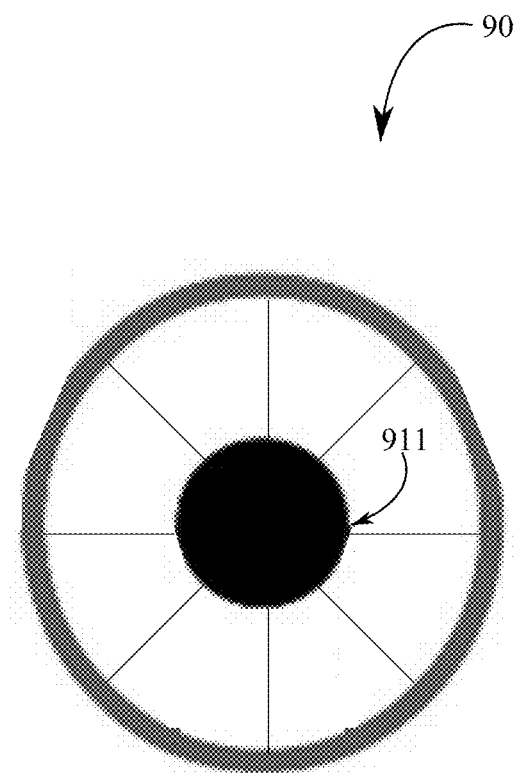
FIG. 13B is a top view of the first fiber covering, wherein the receiving channel of the first fiber covering is illustrated.

As seen in FIG. 5B and FIG. 13A, the water level and well depth measuring device of the present disclosure further comprises a first fiber covering 91, wherein the first fiber covering 91 is terminally connected to the first end 311 of the hollow cylindrical body 31 to conceal an opening delineated at the first end 311 of the hollow cylindrical body 31. In further reference to FIG. 5B, FIG. 13A, and FIG. 13B, the water level-detecting wire 15 of the level-measuring module 11, the well depth-detecting wire 22 of the base-measuring module 21, and the mutual wire 41 are positioned through a receiving channel 900 formed in the first fiber covering 91, wherein a diameter of the receiving channel 900 is within a range of 2 mm-6 mm, 2.5 mm-5 mm, with a preferable diameter within a range of 3 mm-4.5 mm. Preferably, as shown in FIG. 5B, a cable insulator 901 is positioned along an internal surface of the receiving channel 900 for insulation purposes. In a preferred embodiment, as seen in FIG. 13A, the first fiber covering 91 is cone-shaped. However, in other embodiments, the first fiber covering 91 may be, but is not limited to, a cylindrical shape. Preferably, an operational temperature of the first fiber covering 91 seen in FIG. 13A and FIG. 13B is within a range of 90° C.-120° C., 95° C.-115° C., with a preferable operational temperature of about 110° C.

As illustrated in FIG. 5B, the water level and well depth measuring device of the present disclosure further comprises a third heat shrink insulator 73 that perimetrically sleeves the first end 311 of the hollow cylindrical body 31 and the first fiber covering 91. Similar to the second heat shrink insulator 72, shown in FIGS. 5A-5C, a polyolefin heat shrink or an adhesive lined heat shrink may be used as the third heat shrink insulator 73.

Figure 14A:
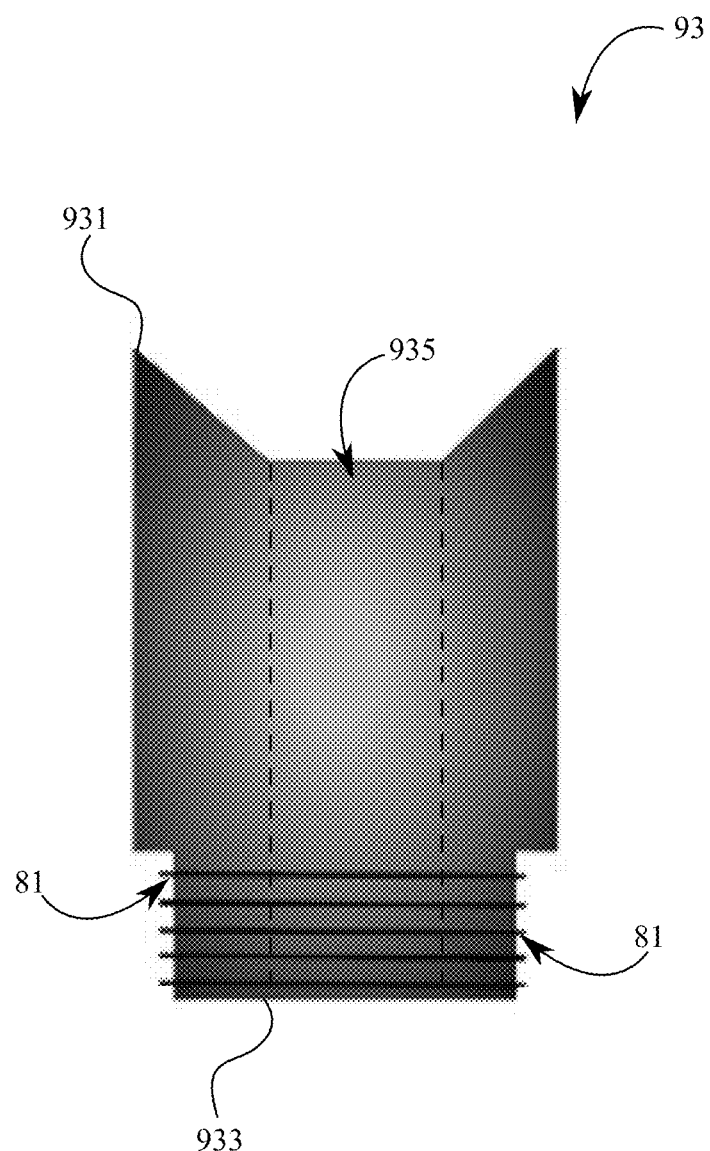
FIG. 14A is an illustration of a second fiber covering, wherein an internal end, an external end, and a receiving channel are illustrated.
Figure 14B:
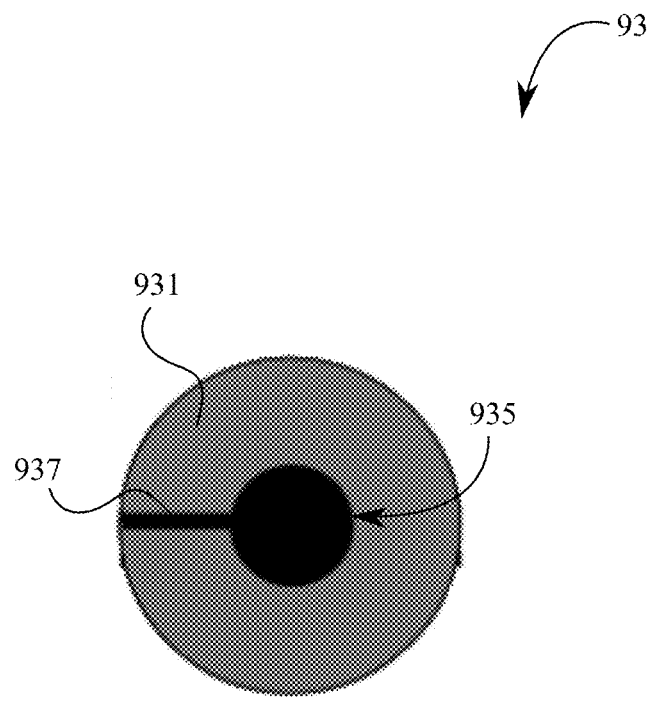
FIG. 14B is a top view of the second fiber covering, wherein the internal end, the receiving channel, and a positioning channel are illustrated.
Figure 14C:
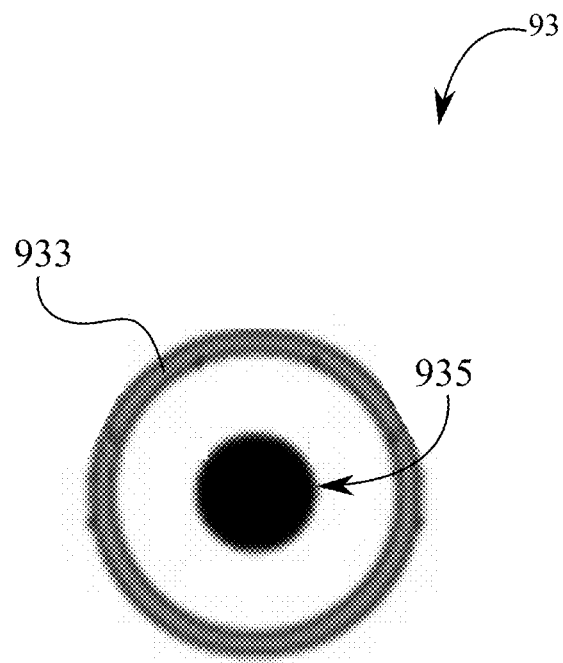
FIG. 14C is a bottom view of the second fiber covering, wherein the external end and the receiving channel are illustrated.

In reference to FIG. 5B and FIGS. 14A-14C, to conceal an opening delineated at the second end 313 of the hollow cylindrical body 31, the water level and well depth measuring device of the present disclosure further comprises a second fiber covering 93, wherein an internal end 931 of the second fiber covering 93 is positioned into the hollow cylindrical body 31 at the second end 313. As seen in FIG. 5B, an external end 933 of the second fiber covering 93 extends outwards from the second end 313 of the hollow cylindrical body 31. In further reference to FIG. 5B, the conductive tube 25 of the base-measuring module 21 is centrally positioned through the second fiber covering 93. In a preferred embodiment, referring to FIG. 14A and FIG. 14B, the conductive tube 25 is positioned into a receiving channel 935 centrally traversing the second fiber covering 93, wherein the conductive tube 25, seen in FIG. 5B, is preferably connected to an internal surface of the receiving channel 935 with an adhesive mechanism. As shown in FIG. 14B, for the well depth-detecting wire 22 to reach the conductive tube 25, a positioning channel 937 having a width within a range of 0.5 mm-2.5 mm, 0.75 mm-1.5 mm, with a preferable width of about 1 mm is formed along the internal end 931 of the second fiber covering 93.

In a preferred embodiment, a length of the second fiber covering 93, shown in FIG. 14A and FIG. 14B, is within a range of 15 mm-25 mm, 18 mm-21 mm, with a preferable length of about 20 mm. To snugly fit within the hollow cylindrical body 31, as shown in FIG. 5B, an outer diameter of the second fiber covering 93 is within a range of 8 mm-16 mm, 10 mm-12 mm, with a preferable outer diameter within a range of 11 mm-13 mm. In a preferred embodiment, referring to FIG. 14A, the internal end 931 of the second fiber covering 93 is cone-shaped, and a plurality of grooves 81 is distributed on the external end 933 of the second fiber covering 93. Thus, as shown in FIG. 5B, the collapsible cap 27 may be positioned adjacent the second end 313 of the hollow cylindrical body 31 by attaching to the plurality of grooves 81. More specifically, the base section 271 of the collapsible cap 27 may be positioned around the plurality of grooves 81 such that the collapsible cap 27 is positioned adjacent the second end 313 of the cylindrical body 31.

As seen in FIGS. 16A-16C, the measuring probe 1 is connected to the housing 5 via the insulated cable 6. For measuring purposes, a plurality of length markers 600 is equidistantly distributed along a cable body of the insulated cable 6. In a preferred embodiment, a length of the insulated cable 6, shown in FIG. 16B, is within a range of 50 meters (m)-150 m, 60 m-130 m, with a preferable length within a range of 75 m-125 m.

In a preferred embodiment, referring to FIGS. 5A-5C, the measuring probe 1 may be submersed in water for at least a time within a range of 40 hours (hrs)-60 hrs, 45 hrs-55 hrs, and 47 hrs-52 hrs without water leakage. Furthermore, the measuring probe 1 of FIGS. 5A-5C may be submersed at a well depth of at least 25 meters (m)-50 m, 30 m-45 m, 32.5 m-42.5 m, for a time of at least 10 minutes (min)-60 min, 15 min-50 min, and 25 min-45 min without water leakage.

Terminology used herein is for the purpose of describing particular embodiments only and is not intended to be limiting of the invention.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

Spatially relative terms, such as "under", "below", "lower", "over", "upper", "in front of" or "behind" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The description and specific examples, while indicating embodiments of the technology, are intended for purposes of illustration only and are not intended to limit the scope of the technology. Moreover, recitation of multiple embodiments having stated features is not intended to exclude other embodiments having additional features, or other embodiments incorporating different combinations of the stated features. Specific examples are provided for illustrative purposes of how to make and use the compositions and methods of this technology and, unless explicitly stated otherwise, are not intended to be a representation that given embodiments of this technology have, or have not, been made or tested.

Obviously, numerous modifications and variations of the present invention are possible in light of the above teachings. It is therefore to be understood that within the scope of the appended claims, the invention may be practiced otherwise than as specifically described herein.

The invention claimed is:

1. A water level and well depth measuring device, comprising:
   a measuring probe, wherein the measuring probe comprises a level-measuring module, and a base-measuring module, wherein the level-measuring module and the base-measuring module are integrated into a hollow cylindrical body of the measuring probe and the hollow cylindrical body of the measuring probe has a fluid-passing slot formed therein;
   a control switch to alternate between the level-measuring module and the base-measuring module, wherein the control switch is a three-way switch electronically connected to the measuring probe;
   a processing unit, wherein the processing unit is electronically connected to the control switch, wherein the processing unit is communicably coupled to a visual indicator and an audible alarm, wherein the processing unit is communicably coupled with the measuring probe, wherein the processing unit includes circuitry with program instructions to:
      receive a level-detection signal from the level-measuring module, wherein the level-measuring module is selected by the control switch,
      activate the visual indicator and the audible alarm if a control circuit of the level-measuring module is completed by contacting water,
      deactivate the visual indicator and the audible alarm, wherein the base-measuring module is selected by the control switch,
      receive a base-detection signal from the base-measuring module, and
      activate the visual indicator and the audible alarm if a control circuit of the base-measuring module is completed by contacting a well bottom;
   an external power source to provide an operating voltage, wherein the external power source is electronically connected to the measuring probe, the control switch, and the processing unit; and
   a housing, wherein the control switch, the processing unit, and the external power source are integrated into a structural body of the housing, wherein the measuring probe is electronically connected to the control switch via an insulated cable extending from an outlet of the housing,
   a mutual wire, wherein a first end of the mutual wire is connected to a second terminal of the control switch and a second end of the mutual wire is connected to an internal surface of the hollow cylindrical body;
   wherein the base-measuring module comprises a well depth-detecting wire, a conductive rod, a conductive tube, a conductive disk, and a collapsible cap;
   the conductive disk being concentrically aligned within the hollow cylindrical body, wherein the conductive disk having a positioning groove formed along a perimeter therein is positioned adjacent a second end of the hollow cylindrical body, wherein the conductive disk is positioned in between a second end of the hollow cylindrical body and the fluid-passing slot;
   the well depth-detecting wire being positioned along an internal surface of the hollow cylindrical body and through the positioning groove, wherein a first end of the well depth-detecting wire is electronically connected to a third terminal of the control switch and a second end of the well depth-detecting wire is connected to the conductive tube;
   the conductive tube being concentrically aligned with the hollow cylindrical body and positioned into the hollow cylindrical body at the second end of the hollow cylindrical body;
   the conductive rod being slidably positioned into the conductive tube at the second end of the hollow cylindrical body, wherein a length of the conductive rod is greater than a length of the conductive tube, wherein the conductive rod is positioned perpendicular to the conductive disk, wherein an internal end of the conductive rod is positioned adjacent the conductive disk; and
   the collapsible cap being positioned adjacent the second end of the hollow cylindrical body, wherein the collapsible cap is positioned adjacent an external end of the conductive rod.

2. The water level and well depth measuring device of claim 1, wherein
   the level-measuring module comprises a fluid-detecting pin, a water level-detecting wire, and a cylindrical block having a positioning channel formed therein;
   the cylindrical block being positioned within the hollow cylindrical body of the measuring probe in between a first end of the hollow cylindrical body and the fluid-passing slot;
   the fluid-detecting pin being partially positioned into a second end of the positioning-channel, wherein an open end of the fluid-detecting pin extends outwards to the fluid-passing slot, wherein a concealed end of the fluid-detecting pin is positioned within the positioning channel; and
   the water level detecting wire being positioned within the positioning channel, wherein a first end of the water level detecting wire is connected to a first terminal of the control switch and a second end of the water level-detecting wire is inserted into the positioning channel and electrically connected to the concealed end of the fluid-detecting pin.

3. The water level and well depth measuring device of claim 2 further comprising:
a first heat shrink insulator, wherein the concealed end of the fluid-detecting pin and the second end of the water level-detecting wire are perimetrically sleeved by the first heat shrink insulator.

4. The water level and well depth measuring device of claim 1, wherein the fluid-passing slot is perimetrically surrounded with adhesive epoxy.

5. The water level and well depth measuring device of claim 1, wherein the collapsible cap is manufactured from rubber.

6. The water level and well depth measuring device of claim 1, further comprising:
a second heat shrink insulator, wherein a base section of the collapsible cap and the second end of the hollow cylindrical body are perimetrically sleeved by the third heat shrink insulator.

7. The water level and well depth measuring device of claim 1, wherein the hollow cylindrical body is manufactured from stainless steel.

8. The water level and well depth measuring device of claim 1 further comprising:
a second fiber covering having a receiving channel formed therein, wherein an internal end of the second fiber covering is positioned into the hollow cylindrical body at a second end of the hollow cylindrical body, wherein an external end of the second fiber covering extends outwards from the second end of the hollow cylindrical body; and
the conductive tube of the base-measuring module being positioned into the receiving channel formed in the second fiber covering.

9. The water level and well depth measuring device of claim 8, wherein a base section of a collapsible cap is attached to the external end of the second fiber covering with a plurality of grooves.

10. The water level and well depth measuring device of claim 1, wherein
the processing unit comprises a sensitivity switch, a plurality of resistors, and at least one transistor; and
the sensitivity switch, the plurality of resistors, the at least one transistor, the visual indicator, and the audible alarm being electronically connected to each other in series.

11. The water level and well depth measuring device of claim 10, wherein the sensitivity switch is a potentiometer.

12. The water level and well depth measuring device of claim 1, wherein the external power source is a 9-volt battery.

13. The water level and well depth measuring device of claim 1, wherein the insulated cable comprises a plurality of length markers, wherein each of the plurality of length markers is equidistantly distributed along a cable body of the insulated cable.

14. The water level and well depth measuring device of claim 1, wherein a length of the insulated cable is within a range of 75 meters (m)-125 m.

15. The water level and well depth measuring device of claim 1, wherein the processing unit and the external power source are concealed within the structural body of the housing with at least one acrylic sheet.

16. A water level and well depth measuring device comprising:
a measuring probe, wherein the measuring probe comprises a level-measuring module, and a base-measuring module, wherein the level-measuring module and the base-measuring module are integrated into a hollow cylindrical body of the measuring probe;
a control switch to alternate between the level-measuring module and the base-measuring module, wherein the control switch is a three-way switch electronically connected to the measuring probe;
a processing unit, wherein the processing unit is electronically connected to the control switch, wherein the processing unit is communicably coupled to a visual indicator and an audible alarm, wherein the processing unit is communicably coupled with the measuring probe, wherein the processing unit includes circuitry with program instructions to:
receive a level-detection signal from the level-measuring module, wherein the level-measuring module is selected by the control switch,
activate the visual indicator and the audible alarm if a control circuit of the level-measuring module is completed by contacting water,
deactivate the visual indicator and the audible alarm, wherein the base-measuring module is selected by the control switch,
receive a base-detection signal from the base-measuring module, and
activate the visual indicator and the audible alarm if a control circuit of the base-measuring module is completed by contacting a well bottom;
an external power source to provide an operating voltage, wherein the external power source is electronically connected to the measuring probe, the control switch, and the processing unit;
a housing, wherein the control switch, the processing unit, and the external power source are integrated into a structural body of the housing, wherein the measuring probe is electronically connected to the control switch via an insulated cable extending from an outlet of the housing;
a first fiber covering, wherein the first fiber covering is terminally connected to a first end of the hollow cylindrical body; and
a water level-detecting wire of the level-measuring module, a well depth-detecting wire of the base-measuring module, and a mutual wire of the measuring probe being positioned through a receiving channel formed within the first fiber covering, wherein a cable insulator is positioned along an internal surface of the receiving channel.

17. The water level and well depth measuring device of claim 16, wherein the first fiber covering is cone-shaped.

18. The water level and well depth measuring device of claim 16 further comprising:
a third heat shrink insulator, wherein the first fiber covering and a first end of the hollow cylindrical body are perimetrically sleeved by the third heat shrink insulator.

* * * * *